United States Patent
Kato et al.

(10) Patent No.: US 11,111,365 B2
(45) Date of Patent: Sep. 7, 2021

(54) POLYOLEFIN STRUCTURE

(71) Applicant: Mitsubishi Gas Chemical Company, Inc., Tokyo (JP)

(72) Inventors: Tomonori Kato, Kanagawa (JP); Kenji Kouno, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 94 days.

(21) Appl. No.: 16/340,794

(22) PCT Filed: Sep. 19, 2017

(86) PCT No.: PCT/JP2017/033748
§ 371 (c)(1),
(2) Date: Apr. 10, 2019

(87) PCT Pub. No.: WO2018/070194
PCT Pub. Date: Apr. 19, 2018

(65) Prior Publication Data
US 2020/0048441 A1 Feb. 13, 2020

(30) Foreign Application Priority Data
Oct. 14, 2016 (JP) ............... JP2016-202607

(51) Int. Cl.
| | |
|---|---|
| C08L 23/06 | (2006.01) |
| B65D 1/02 | (2006.01) |
| C08J 3/20 | (2006.01) |
| B29C 49/00 | (2006.01) |
| B29K 23/00 | (2006.01) |
| B29K 77/00 | (2006.01) |
| B29L 31/00 | (2006.01) |

(52) U.S. Cl.
CPC ............ *C08L 23/06* (2013.01); *B65D 1/0207* (2013.01); *C08J 3/201* (2013.01); *B29C 49/0005* (2013.01); *B29K 2023/065* (2013.01); *B29K 2077/00* (2013.01); *B29L 2031/712* (2013.01); *C08L 2205/025* (2013.01); *C08L 2205/03* (2013.01); *C08L 2207/062* (2013.01)

(58) Field of Classification Search
None
See application file for complete search history.

(56) References Cited

U.S. PATENT DOCUMENTS

| | | |
|---|---|---|
| 2008/0014376 A1 | 1/2008 | Horio et al. |
| 2008/0212213 A1 | 9/2008 | Kogure et al. |
| 2015/0329712 A1* | 11/2015 | Ishii ............. C08L 23/06 |
| | | 428/36.92 |

FOREIGN PATENT DOCUMENTS

| | | |
|---|---|---|
| EP | 1548059 A1 | 6/2005 |
| EP | 1886810 A1 | 2/2008 |
| EP | 2082861 A1 | 7/2009 |
| JP | 2007-177208 A | 7/2007 |
| JP | 2012-245742 A | 12/2012 |
| TW | 200613396 A | 5/2006 |
| TW | 200613442 A | 5/2006 |
| WO | 2010/147097 A1 | 12/2010 |
| WO | 2012/005204 A1 | 1/2012 |
| WO | 2012/121295 A1 | 9/2012 |
| WO | 2014/103054 A1 | 7/2014 |
| WO | 2014/156701 A1 | 10/2014 |

OTHER PUBLICATIONS

International Search Report for PCT/JP2017/033748, dated Dec. 12, 2017, and English Translation submitted herewith (5 pages).

* cited by examiner

*Primary Examiner* — Ana L. Woodward
(74) *Attorney, Agent, or Firm* — Fitch, Even, Tabin & Flannery LLP

(57) ABSTRACT

A polyolefin-based structure includes 60 to 97% by mass of a polyolefin (A), 1 to 35% by mass of an acid-modified polyolefin (B), and 2 to 35% by mass of a polyamide resin (C), in which the polyamide resin (C) is dispersed in a layered form in the polyolefin (A), and the polyamide resin (C) is a melt-kneaded product of 30 to 70% by mass of a polyamide (X) that contains a diamine unit containing 70 mol % or more of a m-xylylenediamine unit and a dicarboxylic acid unit containing an α,ω-linear aliphatic dicarboxylic acid unit and 30 to 70% by mass of an aliphatic polyamide (Y) (provided that a total of the polyamide (X) and the polyamide (Y) is taken as 100% by mass), and a difference between a melting point $Tm_0$ of the polyamide (X) as observed by differential scanning calorimetry and a melting point $Tm_1$ derived from the polyamide (X) in the polyamide resin (C), is 0.1 to 2.5° C.

13 Claims, No Drawings

POLYOLEFIN STRUCTURE

CROSS-REFERENCE TO RELATED APPLICATIONS

This application is a U.S. national phase application filed under 35 U.S.C. § 371 of International Application Number PCT/JP2017/033748, filed Sep. 19, 2017, designating the United States, which claims priority from Japanese Application Number 2016-202607, filed Oct. 14, 2016.

FIELD OF THE INVENTION

The present invention relates to a resin structure.

BACKGROUND OF THE INVENTION

Containers for storing hydrocarbons, various chemicals, toiletry products, sanitary products, cosmetics, beverages, ground meat foods, and the like include, for example, fuel tanks for automobiles or small size engines, bottles, cans, tubes, and the like. Many of the metals or glasses conventionally used as raw materials for these members have been now replaced with a plastic material as an alternative material. The plastic material has advantages such as a light weight, no need of a rust-proof treatment, less breakage, and a high degree of freedom of shape as compared with metals or glasses.

Among the above uses, in most containers used for uses such as various chemicals, toiletry products, sanitary products, cosmetics, beverages, and ground meat foods, polyolefins such as a high-density polyethylene (hereinafter, sometimes abbreviated as "HDPE") or polyesters such as a polyethylene terephthalate are used. Most of the containers have excellent mechanical strength, molding processability, creativity, and economical efficiency. However, the container has disadvantages in that when an article in the container contains volatile components, the components are likely to be scattered in the air through the container wall, and the function of the article is impaired, or oxygen enters from the outside of the container wall, causing the article in the container to be oxidized to impair the flavor. Particularly in recent years, regulations on the amount of permeation of gasoline for gasoline tanks made of a resin and peripheral members thereof have become stricter year by year from the viewpoint of environmental pollution, and therefore, the existing tanks made of plastic encounter difficulty in complying with such regulations, and as a result, there is an increasing demand for techniques for enhancing the barrier property against gasoline.

As a plastic container having high barrier property, a container obtained by molding a resin composition containing a polyolefin, a modified polyolefin, and a barrier resin by blow molding or the like has been proposed (see, for example, PTL 1). In particular, it is known that containers in which a m-xylylene group-containing polyamide is used as a barrier resin and dispersed in a layered form in a polyolefin are also excellent in barrier properties against as fuels such as gasoline or organic solvents, oxygen, and the like.

However, due to the fact that the m-xylylene group-containing polyamide is a structurally very hard resin, there has been a problem that a polyolefin-based container containing the m-xylylene group-containing polyamide has low drop impact resistance. Further, a container produced by a direct blow method inevitably has a so-called pinch-off portion in which a parison is bitten off by a mold. The pinch-off portion is a portion formed by adhering the inner surfaces of the parison to each other, and depending on the molding conditions or the type of material constituting the parison, the adhesiveness of the pinch-off portion becomes insufficient, so that a problem of insufficient strength of a structure may occur. In addition, there was also a concern that there occurred a problem that a barrier resin was not dispersed in a layered form and the barrier property deteriorates in the pinch-off portion. Particularly in a container required to have high strength and barrier property such as a gasoline tank, there was a problem of deterioration in strength or barrier property due to the pinch-off portion.

As a method for solving these problems, for example, PTL 2 discloses a polyethylene-based structure containing 60 to 90% by mass of a polyethylene, 5 to 35% by mass of an acid-modified polyethylene, and 5 to 35% by mass of a m-xylylene group-containing polyamide, in which the m-xylylene group-containing polyamide is dispersed in a layered form in the polyethylene, and when each component satisfies predetermined requirements, tensile strength of a pinch-off portion is improved, and an excellent barrier property against the pseudo-gasoline and excellent drop strength are exhibited.

Furthermore, PTL 3 discloses a direct blow container containing 60 to 90% by mass of a polyethylene, 5 to 35% by mass of an acid-modified polyethylene, and 5 to 35% by mass of a m-xylylene group-containing polyamide, in which the m-xylylene group-containing polyamide is dispersed in a layered form in the polyethylene, and the barrier property and the dropping strength are improved by setting the width of a protrusion of a pinch-off portion to a predetermined range.

CITATION LIST

Patent Literature

PTL 1: JP 2007-177208 A
PTL 2: WO 2012/121295
PTL 3: JP 2012-245742 A

SUMMARY OF INVENTION

However, even by the above method, the barrier property or drop impact resistance, particularly, the drop impact resistance at a low temperature of 0° C. or less is not always sufficient in some cases. In particular, when titanium oxide or the like is blended in order to impart light shielding property or concealing property to a container, there is a problem that the barrier property or drop impact resistance is more likely to deteriorate. Further, in a method for defining the width of a protrusion of a pinch-off portion of a container as in PTL 3, the shape of the container is restricted.

An object of the present invention is to provide a polyolefin-based structure which is excellent in barrier properties against as fuels such as gasoline or organic solvents, oxygen, and the like, and particularly excellent in drop impact resistance at low temperature.

The present invention relates to the following <1> to <13>.

<1> A polyolefin-based structure including 60 to 97% by mass of a polyolefin (A), 1 to 35% by mass of an acid-modified polyolefin (B), and 2 to 35% by mass of a polyamide resin (C), wherein the polyamide resin (C) is dispersed in a layered form in the polyolefin (A), and the polyamide resin (C) is a melt-kneaded product of 30 to 70% by mass of a polyamide (X) that contains a diamine unit containing 70 mol % or more of a m-xylylenediamine unit and a dicarboxylic acid unit containing an α,ω-linear aliphatic dicarboxylic acid unit and 30 to 70% by mass of an aliphatic polyamide (Y), provided that a total of the polyamide (X) and the polyamide (Y) is taken as 100% by mass, and a difference between a melting point $Tm_0$ of the polyamide (X) as observed by differential scanning calorimetry and a melting point $Tm_1$ derived from the polyamide (X) in the polyamide resin (C), is from 0.1 to 2.5° C.

<2> The polyolefin-based structure according to the above <1>, further including a light-shielding material (D) in an amount of more than 0% by mass and 10% by mass or less.

<3> The polyolefin-based structure according to the above <1> or <2>, wherein the α,ω-linear aliphatic dicarboxylic acid unit in the polyamide (X) has from 4 to 20 carbon atoms.

<4> The polyolefin-based structure according to the above <3>, wherein the α,ω-linear aliphatic dicarboxylic acid unit in the polyamide (X) is an adipic acid unit.

<5> The polyolefin-based structure according to any one of the above <1> to <4>, wherein the dicarboxylic acid unit in the polyamide (X) contains the α,ω-linear aliphatic dicarboxylic acid unit and an isophthalic acid unit in a total amount of 70 mol % or more, and a molar ratio of the α,ω-linear aliphatic dicarboxylic acid unit to the isophthalic acid unit is from 20:80 to 100:0.

<6> The polyolefin-based structure according to any one of the above <1> to <5>, wherein the aliphatic polyamide (Y) is one or more selected from the group consisting of Nylon 6, Nylon 6,6, and Nylon 6,6/6.

<7> The polyolefin-based structure according to any one of <1> to <6>, wherein a melt flow rate of the acid-modified polyolefin (B) is from 0.1 to 10 g/10 min.

<8> The polyolefin-based structure according to any one of the above <1> to <7>, wherein an acid value of the acid-modified polyolefin (B) is from 5 to 30 mgKOH/g.

<9> The polyolefin-based structure according to any one of the above <1> to <8>, wherein a density of the acid-modified polyolefin (B) is from 0.910 to 0.970 g/cm$^3$.

<10> The polyolefin-based structure according to any one of the above <2> to <9>, wherein the light-shielding material (D) is titanium oxide.

<11> The polyolefin-based structure according to any one of the above <1> to <10>, which is a container.

<12> A method for producing the polyolefin-based structure according to any one of the above <1> to <11>, including:
step (1): melt-kneading 30 to 70% by mass of a polyamide (X) that contains a diamine unit containing 70 mol % or more of a m-xylylenediamine unit and a dicarboxylic acid unit containing an α,ω-linear aliphatic dicarboxylic acid unit and 30 to 70% by mass of an aliphatic polyamide (Y), provided that a total of the polyamide (X) and the polyamide (Y) is taken as 100% by mass, at a temperature of a melting point $Tm_0$ of the polyamide (X)+10° C. or more and $Tm_0$+60° C. or less to thereby obtain a polyamide resin (C); and
step (2): molding a resin composition containing 60 to 97% by mass of a polyolefin (A), 1 to 35% by mass of an acid-modified polyolefin (B) and 2 to 35% by mass of the polyamide resin (C) to thereby obtain a polyolefin-based structure.

<13> The method for producing the polyolefin-based structure according to the above <12>, wherein the molding method in step (2) is a direct blow method.

The polyolefin-based structure of the present invention can satisfy both excellent barrier property and drop impact resistance at low temperature, and can be effectively used as a container for storing fuels such as gasoline, kerosene, and light oil, organic solvents such as aromatic hydrocarbons, other articles, agricultural chemicals, detergents, foods, chemicals, and the like.

DESCRIPTION OF EMBODIMENTS

[Polyolefin-based structure]

A polyolefin-based structure of the present invention includes 60 to 97% by mass of a polyolefin (A), 1 to 35% by mass of an acid-modified polyolefin (B), and 2 to 35% by mass of a polyamide resin (C), in which the polyamide resin (C) is dispersed in a layered form in the polyolefin (A), and the polyamide resin (C) is a melt-kneaded product of 30 to 70% by mass of a polyamide (X) that contains a diamine unit containing 70 mol % or more of a m-xylylenediamine unit and a dicarboxylic acid unit containing an α,ω-linear aliphatic dicarboxylic acid unit and 30 to 70% by mass of an aliphatic polyamide (Y) (provided that a total of the polyamide (X) and the polyamide (Y) is taken as 100% by mass), and a difference between a melting point $Tm_0$ of the polyamide (X) as observed by differential scanning calorimetry and a melting point $Tm_1$ derived from the polyamide (X) in the polyamide resin (C), is 0.1 to 2.5° C. The polyolefin-based structure of the present invention may further include a light-shielding material (D) in order to impart light shielding property.

Hereinafter, each component contained in a polyolefin-based structure (hereinafter, also simply referred to as a "structure") will be described.

(Polyolefin (A))

The polyethylene (A) is a material which is a main component constituting a polyolefin-based structure. Examples of the polyolefin (A) include polyethylenes as typified by low-density polyethylene, medium-density polyethylene, high-density polyethylene, linear low-density polyethylene, and the like; polypropylenes as typified by propylene homopolymer, ethylene-propylene block copolymer, ethylene-propylene random copolymer, and the like; homopolymers of an ethylenic hydrocarbon having 2 or more carbon atoms, such as 1-polybutene and 1-polymethylpentene; homopolymers of an α-olefin having 3 to 20 carbon atoms; copolymers of α-olefins having 3 to 20 carbon atoms; and copolymers of an α-olefin having 3 to 20 carbon atoms and a cyclic olefin. Further, the polyolefin (A) is an unmodified polyolefin, that is, a polyolefin which is not modified by an acid.

As an index for the melt viscosity and the molecular weight of a polyolefin, a melt flow rate (MFR) is representative. The polyolefin (A) used in the present invention has, for example, a melt flow rate (MFR) of 0.01 to 10 (g/10 min). In addition, the optimum range of the MFR of the polyolefin (A) varies in accordance with the production method of structures, and for example, in the case where the structure is a hollow container produced according to a direct blow method, the MFR is preferably 0.01 to 2.5 (g/10 min), more preferably 0.02 to 1.5 (g/10 min), and even more preferably 0.05 to 1 (g/10 min). Furthermore, in the case where the structure is a sheet molded article produced according to a T-die method, the MFR is preferably 0.01 to 10 (g/10 min), more preferably 0.5 to 5 (g/10 min), even more preferably 1 to 3 (g/10 min). In the case where the structure is a hollow container produced according to a direct blow method, by setting the MFR of the polyethylene (A) to 2.5 (g/10 min) or less, the occurrence of drawdown upon molding processing can be suppressed, and moreover, the resulting container has excellent thickness accuracy. Further, when the MFR of the polyolefin (A) is 0.01 (g/10 min) or more, the melt viscosity could be suitable for molding and, in addition, the dispersion state of the polyamide resin (C) in the resultant container could be bettered and, as a result, a container having an excellent barrier property can be obtained.

In addition, the MFRs of the polyolefin (A) and an acid-modified olefin (B) to be described below are values measured in accordance with HS K7210-1: 2014, in the case of a polyethylene, the MFR is measured under the condition of 190° C. and 2.16 kgf, and in the case of a polypropylene, the MFR is measured under the condition of 230° C. and 2.16 kgf.

The melting point (Am) of the polyolefin (A) is, but not particularly limited to, for example, 100 to 180° C., preferably 125 to 170° C. Furthermore, the melting point may be measured by using a differential scanning calorimeter, and specifically, may be measured by the method described in the Examples.

The polyolefin (A) is preferably any of the above-described polyethylenes or polypropylenes, and a high-density polyethylene (HDPE) is more preferably used.

The high-density polyethylene (HDPE) is a polyethylene having a density of 0.930 g/cm$^3$ or more, and the density is preferably 0.970 g/cm$^3$ or less, more preferably 0.935 to 0.965 g/cm$^3$. As the density of the polyethylene increases, the crystallinity becomes sufficient and the strength, chemical resistance, and the like of the container can be enhanced. Further, when the density is 0.970 g/cm$^3$ or less, the polyolefin (A) is not brittle like glass, and furthermore, from the viewpoint that the environmental stress cracking resistance (ESCR), which is an index of chemical resistance of the HDPE, is high, it is possible to exhibit practical strength as structures.

The above-mentioned polyolefins can be used as the polyolefin (A) alone to constitute the polyolefin-based structure, or can be used as a mixture of two or more different types of them, but a high-density polyethylene single substance is more preferred.

(Acid-Modified Polyolefin (B))

The acid-modified polyolefin (B) is a polyolefin grafting-modified with an unsaturated carboxylic acid or the anhydride thereof, which is generally used as an adhesive resin. As a polyolefin in an acid-modified polyolefin, those exemplified hereinabove for the polyolefin (A) are used, and polypropylene and polyethylene are preferably used, and polyethylene is more preferably used. In addition, the acid-modified polyolefin (B) is preferably one prepared by modifying the same type of polyolefin as that of the polyolefin (A) used. That is, in the case where the polyolefin (A) is a polyethylene, the acid-modified polyolefin (B) is preferably one prepared by modifying polyethylene, and in the case where the polyolefin (A) is a polypropylene, one prepared by modifying polypropylene is used as the acid-modified polyolefin (B).

Specific examples of the unsaturated carboxylic acid or the anhydride thereof include acrylic acid, methacrylic acid, α-ethyl acrylic acid, maleic acid, fumaric acid, itaconic acid, citraconic acid, tetrahydrophthalic acid, chloro-maleic acid, butenyl-succinic acid, and the acid anhydrides thereof. In particular, maleic acid and maleic anhydride are preferably used.

As a method of obtaining an acid-modified polyolefin by graft-copolymerizing the polyolefin with the unsaturated carboxylic acid or the anhydride thereof, various known methods in the related art can be used. For example, there can be mentioned a method of melting a polyolefin in an extruder or the like followed by copolymerizing with a graft monomer added thereto, a method of dissolving a polyolefin in a solvent followed by copolymerizing with a graft monomer added thereto, and a method of preparing an aqueous suspension of a polyolefin followed by copolymerizing with a graft monomer added thereto.

The acid-modified polyolefin (B) maintains strength as a polyolefin-based structure by bonding the polyolefin (A) and the polyamide resin (C) dispersed in the polyolefin (A). In addition, in the polyolefin-based structure, the acid-modified substituent of the acid-modified polyolefin (B) is considered to chemically bond to or electrostatically interact with the polyamide resin (C). As a result, the polyamide resin (C) could exist near the acid-modified polyolefin (B) to change the adhesion force owing to the difference in the acid modification rate.

The index of the acid modification rate of the acid-modified polyolefin (B) is an acid value, and the acid value in the present invention is measured according to the method described in JIS K0070-1992. In the present invention, the acid value of the acid-modified polyolefin (B) is preferably 5 to 30 mgKOH/g.

When the acid value of the acid-modified polyolefin (B) is 5 mgKOH/g or more, the adhesiveness between the polyolefin (A) and the polyamide resin (C) in the structure is bettered and there occur few voids in the adhering interface between the two. Consequently, the barrier property and the mechanical strength of the polyolefin-based structure can be readily bettered, and a good drop impact resistance can be maintained even under low temperature conditions of 0° C. or less. In particular, when the polyolefin-based structure is a container and also contains a light-shielding material (D), the drop impact resistance tends to easily deteriorate, but when the acid value of the acid-modified polyolefin (B) is 5 mgKOH/g or more, the container hardly breaks when dropped down.

Furthermore, when the acid value of the acid-modified polyolefin (B) is 30 mgKOH/g or less, the acid-modified polyolefin (B) and the polyamide resin (C) may be hardly localized. Consequently, for example, when the polyolefin-based structure of the present invention is a container, the inner surface of the container can be prevented from being roughened or the thickness can also be prevented from being uneven, and the barrier property or the mechanical strength can be readily bettered.

From the above-mentioned viewpoints, the acid value of the acid-modified polyolefin (B) is more preferably 8 to 28 mgKOH/g, even more preferably 10 to 25 mgKOH/g, and still even more preferably 15 to 25 mgKOH/g.

The density of the acid-modified polyolefin (B) used in the present invention is preferably 0.910 to 0.970 g/cm$^3$, more preferably 0.920 to 0.970 g/cm$^3$, even more preferably 0.935 to 0.970 g/cm$^3$, and still even more preferably 0.950 to 0.970 g/cm$^3$. When the density of the acid-modified polyolefin (B) is 0.910 g/cm$^3$ or more, the compatibility of a polyolefin (A) suitable for the present invention with the acid-modified polyolefin (B) is good, and further, even when the adhesiveness to the polyamide resin (C) increases and the structure also contains the light-shielding material (D), the barrier property or the drop impact resistance can be excellent. Further, when the density of the acid-modified polyolefin (B) is 0.970 g/cm$^3$ or less, the structure does not become too hard, and the barrier property or the drop impact resistance can be prevented from deteriorating.

In addition, as for the MFR of the acid-modified polyolefin (B) used in the present invention, it is preferred to use an acid-modified polyethylene having a high melt viscosity from the viewpoint of maintaining the molding processing stability and retention of the strength of the structure, the MFR of the acid-modified polyolefin (B) is preferably 0.1 to 10 (g/10 min), more preferably 0.1 to 8 (g/10 min), and even more preferably 0.2 to 3 (g/10 min) as a value measured according to the method described in JIS K7210-1: 2014.

The melting point (Bm) of the acid-modified polyolefin (B) is not particularly limited but, is, for example, 110 to 180° C., preferably 115 to 170° C.

(Polyamide Resin (C))

The polyamide resin (C) used in the present invention is a melt-kneaded product of 30 to 70% by mass of a polyamide (X) containing a diamine unit containing 70 mol % or more of a m-xylylenediamine unit and a dicarboxylic acid unit containing an α,ω-linear aliphatic dicarboxylic acid unit and 30 to 70% by mass of an aliphatic polyamide (Y) (provided that a total of the polyamide (X) and the polyamide (Y) is taken as 100% by mass), and a difference between a melting point $Tm_0$ of the polyamide (X) and a melting point $Tm_1$ derived from the polyamide (X) in the polyamide resin (C), which are observed by differential scanning calorimetry, is 0.1 to 2.5° C.

The polyamide resin (C) is a resin obtained by mixing the polyamide (X) and the aliphatic polyamide (Y) in a predetermined ratio, performing melt blending (melt-kneading) under heating conditions, and appropriately compatibilizing both of them. While the polyamide (X) is excellent in barrier property in terms of containing contains 70 mol % or more of a m-xylylenediamine unit, the polyamide (X) is a hard resin, so that in a polyolefin-based structure containing the polyamide (X), particularly, the drop impact resistance at low temperature tends to deteriorate.

Furthermore, even when the polyolefin-based structure contains the light-shielding material (D), the barrier property and the drop impact resistance easily deteriorate. When the polyolefin-based structure of the present invention contains the light-shielding material (D), particles of the light-shielding material enter the interface between the acid-modified polyolefin (B) and the polyamide resin (C) to generate voids at the interface, thereby making the barrier property or the dropping resistance strength easily deteriorate.

However, the polyamide resin (C) in which the polyamide (X) is melt-kneaded and appropriately compatibilized with a predetermined amount of the aliphatic polyamide (Y) maintains or improves the excellent barrier property derived from the polyamide (X), and also has flexibility derived from the aliphatic polyamide (Y). Consequently, the polyolefin-based structure of the present invention containing the polyamide resin (C) can satisfy both barrier property and drop impact resistance. In particular, even when the polyolefin-based structure of the present invention contains a light-shielding material (D), a remarkable effect of being capable of suppressing barrier property or dropping resistance strength from deteriorating is exhibited.

"Appropriately compatibilized" does not refer to a state in which the polyamide (X) and the aliphatic polyamide (Y) are completely compatibilized by melt-kneading, and means that as a specific index thereof, a difference between a melting point $Tm_0$ of the polyamide (X) and a melting point $Tm_1$ derived from the polyamide (X) in the polyamide resin (C), which are observed by differential scanning calorimetry, is in a range of 0.1 to 2.5° C.

Even though the polyamide (X) is melt-kneaded and appropriately compatibilized with a predetermined amount of the aliphatic polyamide (Y), the excellent barrier property derived from the polyamide (X) does not deteriorate, and the barrier property is maintained, or improved. The reason is not clear, but is thought as follows.

The polyamide (X) is a resin excellent in barrier property, but has high crystallinity and is hardly melted when heated, and in addition, when the heating temperature is excessively increased, the polyamide (X) is excessively melted, and thus is dispersed in a form of fine particles rather than in a layered form in the polyolefin (A). Consequently, the production conditions need to be precisely controlled such that the polyamide (X) is dispersed in a layered form so as to exhibit excellent barrier property. However, when the polyamide (X) is melt-kneaded and appropriately compatibilized with the aliphatic polyamide (Y), the crystallinity deteriorates and the resin is gradually softened and melted even during the heating, so that it is assumed that the polyamide (X) is easily dispersed in a layered form in a good state in the polyolefin (A).

When the polyamide (X) and the aliphatic polyamide (Y) are melt-kneaded, the terminal groups of both the polyamides react with each other or amide exchange occurs, so that both the polyamides are compatibilized with each other. Here, in the polyamide resin in which the polyamide (X) and the aliphatic polyamide (Y) are completely compatibilized by melt-kneading, only one melting peak of the polyamide resin is observed by differential scanning calorimetry.

However, when both the polyamides are not completely compatibilized, a melting peak derived from polyamide (X) and a melting peak of an aliphatic polyamide (Y) are at least observed by differential scanning calorimetry of a polyamide resin obtained by melt-kneading both the polyamides. In particular, the peak top temperature of the melting peak derived from polyamide (X) is defined as "a melting point $Tm_1$ derived from the polyamide (X) in the polyamide resin (C)." On the other hand, the peak top temperature of the melting peak of the polyamide (X) alone as observed by differential scanning calorimetry before melt-kneading is defined as "a melting point $Tm_0$ of the polyamide (X)."

By melt-kneading and partially compatibilizing the polyamide (X) and the aliphatic polyamide (Y), the melting point $Tm_1$ derived from the polyamide (X) in the polyamide resin (C) shifts toward a side near the melting point of the aliphatic polyamide (Y) rather than the melting point $Tm_0$ before the melt-kneading. The absolute value of the shift amount is "a difference between the melting point $Tm_0$ of polyamide (X) and the melting point $Tm_1$ derived from the polyamide (X) in the polyamide resin (C), which are observed by differential scanning calorimetry." When the difference is in a range of 0.1 to 2.5° C., an excellent barrier property derived from the polyamide (X) is maintained or improved, and furthermore, flexibility derived from the aliphatic polyamide (Y) is imparted because the polyamide (X) in the polyamide resin (C) and the aliphatic polyamide (Y) are appropriately compatibilized, and it is considered that both the barrier property and the drop impact resistance can be satisfied in the resultant structure.

From the viewpoint of obtaining the effect, the difference between the melting point $Tm_0$ and the melting point $Tm_1$ is preferably 0.2 to 2.2° C., more preferably 0.4 to 2.0° C., and even more preferably 0.6 to 1.8° C. Each melting point is measured by differential scanning calorimetry and can be specifically measured by the method described in Examples.

However, for example, when the polyamide (X) and the aliphatic polyamide (Y) are not melt-kneaded but are simply dry-blended, the difference between the melting point $Tm_0$ and the melting point $Tm_1$ is zero, and in this case, the effect of the present invention cannot be obtained. Although the flexibility derived from the aliphatic polyamide (Y) is imparted to some degree as compared to the case of the polyamide (X) alone, the barrier property deteriorates.

In addition, when the polyamide (X) and the aliphatic polyamide (Y) are compatibilized to a degree that the above-described difference between the melting point $Tm_0$ and the melting point $Tm_1$ exceeds 2.5° C., the excellent barrier property derived from the polyamide (X) is not exhibited. The reason is considered to be due to the fact that the barrier property is expressed because the free volume of the polyamide (X) is small and the diffusion coefficient thereof is suppressed, but is considered to be due to the fact that when the polyamide (X) and the aliphatic polyamide (Y) are excessively compatibilized, the structure derived from polyamide (X) is relaxed and the free volume thereof is increased.

Hereinafter, various polyamides constituting the polyamide resin (C) will be described.

<Polyamide (X)>

The polyamide (X) is a polyamide that contains a diamine unit containing 70 mol % or more of a m-xylylenediamine unit and a dicarboxylic acid unit containing an α,ω-linear aliphatic dicarboxylic acid unit. By using a predetermined amount of polyamide (X) in the polyamide resin (C), the polyolefin-based structure of the present invention exhibits an excellent barrier property.

From the viewpoint of the barrier property, the diamine unit constituting the polyamide (X) contains a m-xylylenediamine unit preferably in an amount of 80 mol % or more, more preferably 85 mol % or more, even more preferably 90 mol % or more, and still even more preferably 100 mol %.

In the polyamide (X), examples of the diamine unit other than the m-xylylenediamine unit include, though not limited thereto, a diamine unit having an aromatic ring such as a p-xylylenediamine unit, a diamine unit having an alicyclic structure such as a 1,3-bis(aminomethyl)cyclohexane unit and a 1,4-bis(aminomethyl)cyclohexane unit, and an aliphatic diamine unit such as a tetramethylenediamine unit, a hexamethylenediamine unit, a nonamethylenediamine unit, a 2-methyl-1,5-pentanediamine unit, a polyoxyalkyleneamine unit, and a polyetherdiamine unit. One or two or more of the diamine unit may be contained.

The dicarboxylic acid unit constituting the polyamide (X) contains, from the viewpoint of crystallinity, an α,ω-linear aliphatic dicarboxylic acid unit preferably in an amount of 50 mol % or more, more preferably 60 mol % or more, even more preferably 70 mol % or more, still even more preferably 80 mol % or more, further preferably 85 mol % or more, and further more preferably 90 mol % or more. The upper limit thereof is 100 mol %.

From the viewpoint of crystallinity and barrier property, the number of carbon atoms of the α,ω-linear aliphatic dicarboxylic acid unit is preferably 4 to 20, more preferably 5 to 16, even more preferably 5 to 12, and still even more preferably 6 to 10.

Examples of the α,ω-linear aliphatic dicarboxylic acid unit having 4 to 20 carbon atoms include a succinic acid unit, a glutaric acid unit, an adipic acid unit, a pimelic acid unit, a suberic acid unit, an azelaic acid unit, a sebacic acid unit, a decanedioic acid, an undecanedioic acid unit, and a dodecanedioic acid unit, but are, from the viewpoint of barrier property and crystallinity, preferably one or more selected from the group consisting of an adipic acid unit and a sebacic acid unit, and more preferably an adipic acid unit.

Examples of the dicarboxylic acid unit other than the α,ω-linear aliphatic dicarboxylic acid unit include, though not limited thereto, an alicyclic dicarboxylic acid unit such as a 1,3-cyclohexanedicarboxylic acid unit or a 1,4-cyclohexanedicarboxylic acid, and an aromatic dicarboxylic acid unit such as a terephthalic acid unit, an isophthalic acid unit, an orthophthalic acid unit, a xylylenedicarboxylic acid unit, and a naphthalenedicarboxylic acid unit.

Among the compounds capable of constituting the dicarboxylic acid unit, isophthalic acid or 2,6-naphthalenedicarboxylic acid is preferred as capable of readily obtaining polyamides excellent in barrier property not interfering with the polycondensation reaction in production of the polyamide (X). The dicarboxylic acid unit other than the α,ω-linear aliphatic dicarboxylic acid unit is more preferably an isophthalic acid unit. One or two or more of the dicarboxylic acid unit may be contained.

From the viewpoint of the dispersibility of the polyamide resin (C) in the polyolefin-based structure and the barrier property of the structure, the dicarboxylic acid unit in the polyamide (X) is preferably a dicarboxylic acid unit containing an α,ω-linear aliphatic dicarboxylic acid unit and an isophthalic acid unit in a total amount of 70 mol % or more, in which a molar ratio of the α,ω-linear aliphatic dicarboxylic acid unit to the isophthalic acid unit is 20:80 to 100:0. The total content of the α,ω-linear aliphatic dicarboxylic acid unit and the isophthalic acid unit in the dicarboxylic acid unit is preferably 80 mol % or more, more preferably 85 mol % or more, even more preferably 90 mol % or more, and the upper limit thereof is 100 mol %. Further, the molar ratio of the α,ω-linear aliphatic dicarboxylic acid unit to the isophthalic acid unit is more preferably 30:70 to 100:0, even more preferably 50:50 to 100:0, still even more preferably 80:20 to 100:0, and further preferably 90:10 to 100:0.

In addition to the above-mentioned diamine unit and dicarboxylic acid unit, a unit derived from compounds of lactams such as ε-caprolactam and laurolactam, aliphatic aminocarboxylic acids such as aminocaproic acid and aminoundecanoic acid, an aromatic aminocarboxylic acids such as p-aminomethylbenzoic acid can be used as a copolymerization unit constituting the polyamide (X), as long as the effects of the present invention are not impaired. The proportion of the polymer unit other than the diamine unit and the dicarboxylic acid unit is preferably 30 mol % or less, more preferably 20 mol % or less, even more preferably 15 mol % or less, still even more preferably 5 mol % or less, and further preferably 0 mol %.

The polyamide (X) is produced according to a melt polycondensation method (melt polymerization method). For example, there is a method in which a nylon salt composed of a diamine and a dicarboxylic acid is polymerized in a molten state in the presence of water while heating under pressure and removing added water and condensed water. In addition, the polyamide (X) is also produced by a method in which a diamine is directly added to a dicarboxylic acid in a molten state to effect polycondensation. In this case, in order to maintain the reaction system in a uniform liquid state, the diamine is continuously added to the dicarboxylic acid, and during such a period, the polycondensation is allowed to proceed while elevating the temperature of the reaction system such that the reaction temperature is not lowered below the melting point of an oligoamide and a polyamide to be produced.

In the polycondensation system for the polyamide (X), a phosphorus atom-containing compound may be added for realizing the effect of promoting the amidation reaction and the effect of preventing coloration during polycondensation.

Examples of the phosphorus atom-containing compound include dimethylphosphinic acid, phenylmethyl phosphinic acid, hypophosphorous acid, sodium hypophosphite, potassium hypophosphite, lithium hypophosphite, calcium phosphite, ethyl hypophosphite, phenyl phosphonous acid, sodium phenyl phosphonite, potassium phenyl phosphonite, lithium phenyl phosphonite, ethyl phenyl phosphonite, phenylphosphonic acid, ethyl phosphonic acid, sodium phenyl phosphonate, potassium phenyl phosphonate, lithium phenyl phosphonate, diethyl phenyl phosphonate, sodium ethyl phosphonate, potassium ethyl phosphonate, phosphorous acid, sodium hydrogenphosphite, sodium phosphite, triethyl phosphite, triphenyl phosphite, and pyrophosphorous acid. Among the compounds, particularly metal hypophosphites such as sodium hypophosphite, potassium hypophosphite, lithium hypophosphite, and calcium hypophosphite are preferably used because the effect of promoting the amidation reaction is high and the effect of preventing coloring is also excellent, and in particular, sodium hypophosphite is preferred, but the phosphorus atom-containing compound that can be used in the present invention is not limited to these compounds.

One or two or more of the phosphorus atom-containing compound may be used.

The additive amount of the phosphorus atom-containing compound added in the polycondensation system for the polyamide (X) is preferably 1 to 500 ppm, more preferably 5 to 450 ppm, and even more preferably 10 to 400 ppm, equivalent to the concentration of the phosphorus atoms in the polyamide (X) from the viewpoint of preventing coloration of the polyamide (X) during the polycondensation.

In the polycondensation system for the polyamide (X), an alkali metal compound or an alkaline earth metal compound is preferably added in combination with the phosphorus atom-containing compound. In order to prevent coloration of the polyamide (X) during the polycondensation, it is necessary that the phosphorus atom-containing compound is allowed to be present in a sufficient amount, but in order to adjust the reaction rate of the amidation, it is preferred that the alkali metal compound or the alkaline earth metal compound is allowed to coexist therewith.

Examples of the alkali metal compound or the alkaline earth metal compound include hydroxides of an alkali metal/an alkaline earth metal such as lithium hydroxide, sodium hydroxide, potassium hydroxide, rubidium hydroxide, cesium hydroxide, magnesium hydroxide, calcium hydroxide, and barium hydroxide, and acetates of an alkali metal/an alkaline earth metal such as lithium acetate, sodium acetate, potassium acetate, rubidium acetate, cesium acetate, magnesium acetate, calcium acetate, and barium acetate but an alkali metal compound or an alkaline earth metal compound can be used without being limited to these compounds. One or two or more of the compounds may be used.

When the alkali metal compound or the alkaline earth metal compound is added in the polycondensation system for the polyamide (X), a value obtained by dividing the mole number of the compound by that of the phosphorus atom-containing compound is preferably 0.5 to 2.0, more preferably 0.6 to 1.8, and even more preferably 0.7 to 1.5. By setting the additive amount of the alkali metal compound or the alkaline earth metal compound within the above-mentioned range, it is possible to suppress the generation of a gel while obtaining an effect of promoting the amidation reaction by the phosphorus atom-containing compound.

The polyamide (X) obtained by the melt polycondensation is once taken out and pelletized. The resultant pellets may be dried, or may be further subjected to solid-phase polymerization in order to increase the polymerization degree. As a heater used for the drying or the solid phase polymerization, a continuous heated-air dryer; rotating drum heaters also called a tumble dryer, a conical dryer, and a rotary dryer; and a conical heater internally provided with a rotor blade called a Nauta mixer can be suitably used, but known methods and devices can be used without being limited to these heaters. In particular, when a polyamide is subjected to solid phase polymerization, a rotating drum heater among the above-mentioned devices is preferably used because the heater can seal the system and easily promote the polycondensation without the presence of oxygen that causes the coloring.

As an index of the polymerization degree of the polyamide, there are several indices, but a relative viscosity is generally used. The relative viscosity of the polyamide (X) used in the present invention is preferably 1.5 to 4.5, more preferably 2.0 to 4.2, even more preferably 2.3 to 4.0, and further preferably 2.5 to 4.0. As the relative viscosity of the polyamide becomes higher, it becomes difficult for the polyamide to be finely dispersed in the polyolefin (A), and so that a polyamide resin (C) obtained by using the polyamide (X) having a high relative viscosity easily forms a dispersion state in a layered form in the polyolefin (A). However, when the relative viscosity of the polyamide (X) is increased, the polymerization time is prolonged so that the production cost is increased. By setting the relative viscosity of the polyamide (X) within the above-mentioned range, the resultant polyamide resin (C) is dispersed in a layered form, and the production cost of the polyamide can be kept low.

In addition, the relative viscosity is a ratio of a dropping time (t) obtained by dissolving 0.2 g of a polyamide in 20 mL of 96% by mass of sulfuric acid as measured at 25° C. using a Canon Fenske viscometer to a dropping time (t0) of the 96% by mass of sulfuric acid itself as measured in the same manner, and is represented by the following equation.

$$\text{Relative viscosity} = t/t0$$

The melting point $Tm_0$ of the polyamide (X) used in the present invention is typically 165 to 250° C., preferably 180 to 245° C., more preferably 200 to 245° C., and even more preferably 220 to 240° C. The melting point $Tm_0$ of the polyamide (X) is typically higher than the melting point (Am) of the polyolefin (A) and the melting point (Bm) of the acid-modified polyolefin (B).

<Aliphatic polyamide (Y)>

The aliphatic polyamide (Y) is not particularly limited as long as the aliphatic polyamide (Y) is a polyamide containing a structural unit, as a main component, containing an amide bond and containing no aromatic ring in a molecular skeleton. Here, the term "as a main component" refers to a component in which a structural unit containing no aromatic ring in the structural units of the aliphatic polyamide occupies more than 50 mol %, preferably 60 to 100 mol %, more preferably 70 to 100 mol %, even more preferably 80 to 100 mol %, and still even more preferably 100 mol %.

Since the flexibility can be imparted to the polyamide resin (C) by using a predetermined amount of the aliphatic polyamide (Y) in the polyamide resin (C), the polyolefin-based structure of the present invention can exhibit excellent drop impact resistance even under low temperature conditions while maintaining an excellent barrier property derived from the polyamide (X).

Examples of the structural unit of the aliphatic polyamide (Y) include a lactam unit, an aliphatic diamine unit, an aliphatic dicarboxylic acid unit, and an aminocarboxylic acid unit.

Specific examples of the lactam unit constituting the aliphatic polyamide (Y) include an ε-caprolactam unit, an enantholactam unit, and α,ω-laurolactam unit.

Preferred examples of the aliphatic diamine unit constituting the aliphatic polyamide (Y) include a chain aliphatic diamine unit and an alicyclic diamine unit, and among the aliphatic diamine units, preferred examples thereof include an ethylene diamine unit, a propylene diamine unit, a tetramethylene diamine unit, a pentamethylene diamine unit, a hexamethylene diamine unit, an octamethylene diamine unit, a decamethylene diamine unit, an undecamethylene diamine unit, a dodecamethylenediamine unit, a tridecamethylene diamine unit, a nonamethylene diamine unit, a 2-methyl-1,8-octanediamine unit, a 2,2,4-trimethylhexamethylene diamine unit, a 2,4,4-trimethylhexamethylene diamine unit, a 5-methylnonamethylene diamine unit, a 1,3-bis(aminomethyl)cyclohexane unit, and a 1,4-bis(aminomethyl)cyclohexane unit.

Examples of the aliphatic dicarboxylic acid unit constituting the aliphatic polyamide (Y) include a chain aliphatic dicarboxylic acid unit and an alicyclic dicarboxylic acid unit, and preferred examples thereof include a succinic acid unit, a glutaric acid unit, an adipic acid unit, a pimelic acid unit, a suberic acid unit, an azelaic acid unit, a sebacic acid unit, a β-methyladipic acid unit, a decanedioic acid unit, an undecanedioic acid unit, a dodecanedioic acid unit, a 1,1,3-tridecanedioic acid unit, a 1,3-cyclohexanedicarboxylic acid unit, and a 1,4-cyclohexanedicarboxylic acid unit.

Further, specific examples of the aminocarboxylic acid unit include a 7-aminoheptanoic acid unit, a 8-aminooctanoic acid unit, a 9-aminononanoic acid unit, a 10-aminodecanoic acid unit, a 11-aminoundecanoic acid unit, a 12-amino dodecanoic acid unit, and a 13-aminotridecanoic acid unit.

One or two or more of the units constituting the aliphatic polyamide (Y) may be contained.

The aliphatic polyamide (Y) having the structural unit can be obtained, for example, by ring-opening polymerization of lactams, polycondensation of diamine and dicarboxylic acid, polycondensation of aminocarboxylic acid, and the like.

Specific examples of the aliphatic polyamide (Y) include aliphatic polyamides such as poly(6-aminohexanoic acid) (Nylon 6) also known as poly(caprolactam), poly(laurolactam) (Nylon 12), poly(hexamethylene adipamide) (Nylon 6,6), poly(7-aminoheptanoic acid) (Nylon 7), poly(8-aminooctanoic acid) (Nylon 8), poly(9-aminononanoic acid) (Nylon 9), poly(l0-aminodecanoic acid) (Nylon 10), poly (11-aminoundecanoic acid) (Nylon 11), poly(hexamethylene sebacamide) (Nylon 6,10), poly(decamethylene sebacamide) (Nylon 10,10), poly(hexamethylene azelamide) (Nylon 6,9), poly (tetramethylene adipamide) (nylon 4,6), poly (tetramethylene sebacamide) (Nylon 4,10), poly (pentamethylene adipamide) (Nylon 5,6), poly(pentamethylene sebacamide) (Nylon 5,10), a hexamethylene adipamide-caprolactam copolymer (Nylon 6,6/6), poly [methylenebis(2-methylcyclohexyl)dodecamide] (Nylon MACM 12), and poly[4,4'-methylenebis(cyclohexyl)dodecamide] (Nylon PACM 12). These compounds may be used either alone or two or more thereof.

Among the compounds, one or more selected from the group consisting of Nylon 6, Nylon 6,6, and Nylon 6,6/6 are preferred because the one or more are excellent in flexibility, barrier property, and processability, and can be obtained at low cost, and one or more selected from the group consisting of Nylon 6 and Nylon 6,6/6 are more preferred and Nylon 6 is even more preferred from the viewpoint of imparting flexibility to the polyamide resin (C).

The relative viscosity of the aliphatic polyamide (Y) is not particularly limited, but is preferably 1.5 to 5.5 and more preferably 2.0 to 5.0 from the viewpoint of dispersing the obtained polyamide resin (C) in a layered form and from the viewpoint of production cost.

The melting point (Ym) of the aliphatic polyamide (Y) is not particularly limited, but is typically in a range of 150 to 245° C., preferably in a range of 170 to 235° C., more preferably in a range of 180 to 230° C., and even more preferably in a range of 190 to 230° C.

From the viewpoint of improving barrier property by dispersing the polyamide resin (C) in a layered form in the polyolefin (A), it is preferred that the melting point of the aliphatic polyamide (Y) used in the polyamide resin (C) is higher than the melting point (Am) of the polyolefin (A). However, from the viewpoint of easily controlling the degree of compatibilization at the time of melt blending of the polyamide (X) and the polyamide (Y), it is preferred that the melting point of the aliphatic polyamide (Y) is lower than the melting point of the polyamide (X).

The difference ($Tm_0$–Ym) between the melting point $Tm_0$ of the polyamide (X) and the melting point (Ym) of the aliphatic polyamide (Y) is preferably 5.0 to 50° C., more preferably 5.0 to 40° C., even more preferably 5.0 to 30° C., still even more preferably 7.0 to 25° C., further preferably 8.0 to 20° C., and further more preferably 10 to 20° C. When the ($Tm_0$–Ym) is 5.0° C. or more, an appropriate flexibility derived from the aliphatic polyamide (Y) can be imparted to the polyamide resin (C) which is a melt-kneaded product of the polyamide (X) and the aliphatic polyamide (Y). Further, when the ($Tm_0$–Ym) is 50° C. or less, the compatibility of the polyamide (X) and the aliphatic polyamide (Y) is good, so that it is easy to partially compatibilize both the polyamides by melt kneading.

The polyamide resin (C) used in the present invention is a melt-kneaded product of 30 to 70% by mass of the polyamide (X) and 30 to 70% by mass of the aliphatic polyamide (Y) (provided that a total of the polyamide (X) and the polyamide (Y) is taken as 100% by mass). When the content of the polyamide (X) is less than 30% by mass in 100% by mass of the total of the polyamide (X) and the polyamide (Y), the barrier property deteriorates, and when the content exceeds 70% by mass, the drop impact resistance deteriorates. From the above-mentioned viewpoint, in 100% by mass of the total of the polyamide (X) and the polyamide (Y), the content of the polyamide (X) is preferably 35 to 65% by mass, more preferably 40 to 65% by mass, even more preferably 40 to 60% by mass, and still even more preferably 50 to 60% by mass, and the content of the polyamide (Y) is preferably 35 to 65% by mass, more preferably 35 to 60% by mass, even more preferably 40 to 60% by mass, and still even more preferably 40 to 50% by mass.

The polyamide resin (C) can be obtained, for example, by first dry-blending the polyamide (X) and the aliphatic polyamide (Y), and then introducing the resultant material into a single-screw or twin-screw extruder, and performing melt-kneading preferably at a temperature of the melting point $Tm_0$ of the polyamide (X)+10° C. or more and $Tm_0$+60° C. or less. By melt-kneading the polyamide (X) and the aliphatic polyamide (Y) at the above-mentioned predetermined temperature, both the polyamides are appropriately compatibilized, so that it is possible to obtain a polyamide resin (C) capable of satisfying both the barrier property and the drop impact resistance in the structure of the present invention. Details of the method for producing the polyamide resin (C) will be described below.

As described above, for the polyamide resin (C), a plurality of melting peaks (at least a melting peak derived from the polyamide (X) and a melting peak derived from the aliphatic polyamide (Y)) is observed by differential scanning calorimetry. The peak top temperature of the melting peak present on the highest temperature side among the peaks is defined as Tmch. The difference in melting point (Tmch–Am) between Tmch and the melting point (Am) of the polyolefin (A) is preferably 20 to 150° C., more preferably 50 to 120° C., and even more preferably 75 to 120° C. By setting the difference in melting point (Tmch–Am) within the above range, the polyamide resin (C) is easily dispersed in a layered form in the polyolefin (A), so that the barrier property is improved. Furthermore, by a production method to be described below, it is possible to appropriately produce the polyolefin-based structure of the present invention in which the polyamide resin (C) is dispersed in a layered form in the polyolefin (A).

Likewise, the melting point Tmch in the polyamide resin (C) is typically higher than the melting point (Bm) of the acid-modified polyolefin (B), and the difference in melting point (Tmch–Bm) between the two polyamides is preferably 20 to 150° C., more preferably 50 to 120° C., and even more preferably 75 to 120° C.

In the structure of the present invention, the polyamide resin (C) is dispersed in a layered form in the polyolefin (A). The dispersed polyamide resin (C) may partially continue to form a continuous phase. The polyamide resin (C) dispersed in a layered form is preferably in a dispersion state where the polyamide resin (C) is present alternately with the other resin component in the thickness direction of the structure.

In the present invention, examples of a method of dispersing the polyamide resin (C) in a layered form in the polyolefin (A) include: selecting a material so as to set the difference (Tmch-Am) between the melting point (Am) of the polyolefin (A) and the melting point Tmch of the polyamide resin (C) within the above-described preferred range; and molding each component constituting a structure at a temperature where the polyolefin (A) is completely melted, but the polyamide resin (C) is not completely melted nor does not flow. More preferably, it is possible to easily obtain a structure in which the polyamide resin (C) is dispersed in a layered form in the polyolefin (A) by using a method for producing a polyolefin-based structure to be described below.

(Light-Shielding Material (D))

The polyolefin-based structure of the present invention may further contain a light-shielding material (D) in order to impart light shielding property or concealing property. For example, when the structure of the present invention is a hollow container, visible light or ultraviolet light is shielded by containing a predetermined amount of light-shielding material to impart light shielding property, so that it is possible to prevent photodegradation of an article stored in the container. Further, in a structure in which a polyamide is dispersed in a layered form, the color tone becomes non-uniform due to the dispersion of the polyamide in a layered form, so that the appearance may become poor in some cases. In particular, in the structure of the present invention in which the polyamide resin (C), which is a melt-kneaded product of the polyamide (X) and the polyamide (Y), is dispersed in a layered form, the appearance deteriorates remarkably. Therefore, by containing the light-shielding material (D) in the structure of the present invention, the appearance of the structure can be improved by concealing the non-uniformity of color tone due to layer-like dispersion of the polyamide.

The light-shielding material (D) is not particularly limited as long as the light-shielding material (D) can reduce the transmittance of ultraviolet light or visible light, and for example, a known pigment can be used. The color of the pigment can be appropriately selected according to the use thereof, but from the viewpoint of light shielding property, the black color or the white color is preferred. Examples of a black pigment include an organic black pigment such as aniline black and perylene black and an inorganic black pigment containing carbon black, titanium black, other copper, iron, chromium, manganese, cobalt, and the like. Examples of a white pigment include titanium oxide, zinc oxide, zirconia oxide, alumina powder, magnesium oxide, and zinc sulfide. Among the above pigments, one or more selected from the group consisting of carbon black, titanium black, and titanium oxide are preferred, and titanium oxide which is a white pigment is more preferred. When the titanium oxide is contained, the structure of the present invention is colored white, so that an effect of improving the appearance is excellent because the non-uniformity of color tone derived from the layer-like dispersion of the polyamide resin (C) is concealed.

The titanium oxide is not particularly limited as long as the titanium oxide can impart light shielding property to the structure of the present invention, but white titanium dioxide is preferred. The crystal structure of titanium oxide is also not particularly limited, either of rutile type or anatase type can be used, but it is preferred to have a rutile type structure.

From the viewpoint of increasing the affinity with each component constituting the structure of the present invention and uniformly dispersing the component, a titanium oxide surface-treated with a silane coupling agent or the like may be used.

From the viewpoint of imparting light shielding property, the light-shielding material is preferably in the form of particles, and the average particle diameter thereof is preferably 0.01 to 10 μm, more preferably 0.1 to 8 μm, and even more preferably 0.3 to 5 μm.

From the viewpoint of uniformly dispersing the light-shielding material (D) in the structure of the present invention, it is preferred that the light-shielding material (D) is mixed with the components (A) to (C) in a state of a master batch containing a light-shielding material and a thermoplastic resin and is contained in the structure. The thermoplastic resin is not particularly limited as long as the thermoplastic resin is a resin which can uniformly disperse the component (D) and can mix the component (D) with the components (A) to (C), but the thermoplastic resin is preferably a polyolefin-based resin from the viewpoint of compatibility with the other components. Examples of the thermoplastic resin include polyethylenes as typified by low-density polyethylene, medium-density polyethylene, high-density polyethylene, linear low-density polyethylene, and the like; polypropylenes as typified by propylene homopolymer, ethylene-propylene block copolymer, ethylene-propylene random copolymer, and the like; homopolymers of an ethylenic hydrocarbon having 2 or more carbon atoms, such as 1-polybutene and 1-polymethylpentene; homopolymers of an α-olefin having 3 to 20 carbon atoms; copolymers of β-olefins having 3 to 20 carbon atoms; and copolymers of an α-olefin having 3 to 20 carbon atoms and a cyclic olefin.

(Content of Each Component)

The content of each component in the structure of the present invention is as follows: 60 to 97% by mass of the polyolefin (A), 1 to 35% by mass of the acid-modified polyolefin (B), and 2 to 35% by mass of the polyamide resin (C). The content is: preferably 65 to 90% by mass of the polyolefin (A), 5 to 30% by mass of the acid-modified polyolefin (B), and 5 to 30% by mass of the polyamide resin (C), more preferably 70 to 90% by mass of the polyolefin (A), 5 to 25% by mass of the acid-modified polyolefin (B), and 5 to 25% by mass of the polyamide resin (C), and even more preferably 75 to 85% by mass of the polyolefin (A), 7.5 to 12.5% by mass of the acid-modified polyolefin (B), and 7.5 to 12.5% by mass of the polyamide resin (C). However, the total of the components (A) to (C) does not exceed 100% by mass. When the content of each component is within the above range, it is possible to satisfy both the barrier property and the drop impact resistance of the structure.

Furthermore, from the viewpoint of satisfying both the barrier property and the drop impact resistance, the total content of the components (A) to (C) in the structure of the present invention is preferably 85% by mass or more, more preferably 90% by mass or more, even more preferably 95% by mass or more, and the upper limit thereof is 100% by mass.

When the structure of the present invention contains the light-shielding material (D), the content thereof is preferably in a range of more than 0% by mass and 10% by mass or less, more preferably 0.1 to 5% by mass, even more preferably 0.3 to 3% by mass, still even more preferably 0.3 to 2% by mass, and further preferably 0.3 to 1% by mass in the structure of the present invention. When the content of the light-shielding material (D) is 10% by mass or less, the barrier property and drop impact resistance can be maintained while imparting light shielding property to the structure of the present invention. However, the total of the components (A) to (D) does not exceed 100% by mass.
(Other Components)

In addition, it is possible to add, to the structure of the present invention, various copolymerized polyolefins such as an ethylene-ethyl acrylate copolymer (EEA) or an ethylene-methyl acrylate copolymer (EMA); an ionomer, a polystyrene; various polyesters such as polyethylene terephthalate; a styrene-butadiene copolymer and a hydrogenated product thereof; various thermoplastic elastomers and the like, as long as the effects of the present invention are not impaired.

Further, additives such as an antioxidant, a matting agent, a heat-resistant stabilizer, a weathering stabilizer, an ultraviolet absorber, a nucleating agent, a plasticizer, a flame retarder, an antistatic agent, a color protector, and a lubricant may be added to the structure of the present invention, as long as the effects of the present invention are not impaired. In addition, when the polyolefin-based structure is produced, these additives may be typically subjected to molding in a state of mixed with one or more of the components (A) to (D) in advance.
(Shape of Polyolefin-Based Structure)

The polyolefin-based structure of the present invention is usually a single-layered structure formed of a resin composition containing the above-mentioned components (A) to (C) (preferably components (A) to (D)), and a structure obtained by molding the resin composition.

The shape of the polyolefin-based structure of the present invention is not particularly limited, but is preferably a hollow-molded article, sheet-molded article, or a thermoformed article obtained by secondary processing of a sheet-molded article by thermoforming. The thickness of the polyolefin-based structure is not particularly limited, but is about 0.5 to 5 mm, and preferably 0.8 to 3 mm. By setting the thickness of the structure to 0.5 mm or more, the barrier property or strength of the structure can be increased. Furthermore, by setting the thickness to 5 mm or less, weight reduction and cost reduction of the structure can be achieved, and the effect of improving the barrier property can be easily exhibited in the present invention.

The polyolefin-based structure of the present invention is, more specifically, a molded article having a shape of a bottle, a tank, a drum, a cup, a tray, a pipe, a sheet or the like, and is preferably produced by the production method to be described below. Among the shapes, the polyolefin-based structure is preferably a container from the viewpoint of an effect of satisfying the barrier property and the drop impact resistance, and more preferably a container having a shape of a bottle, a tank, a drum, and the like from the viewpoint of being molded by a direct blow method.

When the polyolefin-based structure is a container, a main body of the container has a thickness of about 0.5 to 5 mm, preferably 0.8 to 3 mm.
[Method for Producing Polyolefin-Based Structure]

It is preferred that a method for producing the polyolefin-based structure of the present invention has the following step (1) and step (2). Accordingly, the polyamide resin (C) is dispersed in a layered form in the polyolefin (A), so that it is possible to easily obtain a polyolefin-based structure which satisfies both barrier property and drop impact resistance.

Step (1): melt-kneading 30 to 70% by mass of a polyamide (X) containing a diamine unit containing 70 mol % or more of a m-xylylenediamine unit and a dicarboxylic acid unit containing an α,ω-linear aliphatic dicarboxylic acid unit and 30 to 70% by mass of an aliphatic polyamide (Y) (provided that a total of the polyamide (X) and the polyamide (Y) is taken as 100% by mass) at a temperature of a melting point $Tm_0$ of the polyamide (X)+10° C. or more and $Tm_0$+60° C. or less to thereby obtain a polyamide resin (C)

Step (2): molding a resin composition containing 60 to 97% by mass of a polyolefin (A), 1 to 35% by mass of an acid-modified polyolefin (B) and 2 to 35% by mass of the polyamide resin (C) to thereby obtain a polyolefin-based structure
(Step (1))

In step (1), a polyamide resin (C) is obtained by melt-kneading 30 to 70% by mass of a polyamide (X) that contains a diamine unit containing 70 mol % or more of a m-xylylenediamine unit and a dicarboxylic acid unit containing an α,ω-linear aliphatic dicarboxylic acid unit and 30 to 70% by mass of an aliphatic polyamide (Y) (provided that a total of the polyamide (X) and the polyamide (Y) is taken as 100% by mass) at a temperature of a melting point $Tm_0$ of the polyamide (X)+10° C. or more and $Tm_0$+60° C. or less.

The polyamide (X), the aliphatic polyamide (Y), the blending ratio thereof, and preferred embodiments thereof used in Step (1) are as described above. Further, the polyamide resin (C) is a melt-kneaded product of the predetermined amounts of the polyamide (X) and the aliphatic polyamide (Y), and a difference between a melting point $Tm_0$ of the polyamide (X) and a melting point $Tm_1$ derived from the polyamide (X) in the polyamide resin (C), which are observed by differential scanning calorimetry, is in a range of 0.1 to 2.5° C. That is, in step (1), it is possible to easily obtain a polyamide resin (C) in which the difference between the melting point $Tm_0$ and the melting point $Tm_1$ is in a range of 0.1 to 2.5° C. by melt-kneading the polyamide (X) and the aliphatic polyamide (Y) at a temperature within the predetermined temperature range.

In step (1), for example, the polyamide (X) and the aliphatic polyamide (Y) are dry-blended at room temperature, and then are introduced into an extruder and melt-kneaded at a temperature within a predetermined range.

Next, the melt-kneaded polyamide is extruded into a strand shape, and after cooling the polyamide, a polyamide resin (C) can be obtained by pelletizing the resultant polyamide with a pelletizer. The extruder may be a single-screw extruder or a twin-screw extruder, but from the viewpoint of extrusion stability, a twin screw-extruder is preferred. In the case of using a twin-screw extruder, from the viewpoint of controlling compatibilization, for example, the aliphatic polyamide (Y) can be fed by a top feed and the polyamide (X) is fed by a side feed, thereby increasing the extrusion discharge amount while controlling compatibilization. In the case of using a twin-screw extruder, when the extrusion discharge amount is attempted to be increased, the resin temperature is increased by shear heat generation, so that compatibilization may excessively proceed in some cases. When a method of feeding the polyamide (X) by a side feed is adopted, it is easy to control the degree of compatibilization between the polyamide (X) and the aliphatic polyamide (Y).

It is preferred that the melt-kneading temperature in step (1) is a temperature of a melting point $Tm_0$ of the polyamide (X)+10° C. or more and $Tm_0$+60° C. or less. When the melt-kneading temperature is the melting point $Tm_0$ of the polyamide (X)+10° C. or more, the compatibilization of the polyamide (X) and the aliphatic polyamide (Y) easily proceeds, and when the melt-kneading temperature is $Tm_0$+60° C. or less, it is possible to avoid the barrier property from deteriorating as a result of excessive compatibilization of the polyamide (X) and the aliphatic polyamide (Y).

From the viewpoint, the melt-kneading temperature in step (1) is more preferably the melting point $Tm_0$ of the polyamide (X)+15° C. or more, even more preferably $Tm_0$+20° C. or more, still even more preferably $Tm_0$+30° C. or more, and further preferably $Tm_0$+35° C. or more. Further, the melt-kneading temperature is more preferably $Tm_0$+55° C. or less, even more preferably $Tm_0$+50° C. or less, and still even more preferably $Tm_0$+47° C. or less.

The melt-kneading temperature in step (1) is a temperature (resin temperature) at which each polyamide is melt-kneaded in the extruder, and it is preferred to adjust the temperature of the extruder, such that the temperature falls within the above range. It is preferred to adopt the resin temperature obtained by measuring the actual temperature of the resin discharged from the discharge port of the extruder, but when the difference between a number counted by an infrared radiation thermometer or a thermocouple provided at the discharge port of the extruder and the actual temperature of the resin is determined to some degree, the resin temperature may be adjusted with reference to the numerical value thereof.

The temperature of the extruder may be set to a temperature at which the resin temperature falls within the above range, and may vary depending on the type and size of the extruder, but the set temperature of the extruder is a temperature of preferably the melting point $Tm_0$ of the polyamide (X) or more, more preferably $Tm_0$−10° C. or more, even more preferably $Tm_0$−5° C. or more, still even more preferably $Tm_0$+60° C. or less, further preferably $Tm_0$+40° C. or less, and further more preferably $Tm_0$+30° C. or less.

Further, the melt-kneading time in Step (1) is not particularly limited, but from the viewpoint of appropriately compatibilizing the polyamide (X) and the aliphatic polyamide (Y), the melt-kneading time is preferably in a range of preferably 5 seconds to 1,000 seconds, and more preferably 10 seconds to 600 seconds.

(Step (2))

In step (2), a polyolefin-based structure is obtained by molding a resin composition containing 60 to 97% by mass of a polyolefin (A), 1 to 35% by mass of an acid-modified polyolefin (B) and 2 to 35% by mass of the polyamide resin (C) obtained in step (1).

The resin composition may contain the light-shielding material (D) and other components, if necessary. Further, the polyolefin (A), the acid-modified polyolefin (B), other components, the blending ratio thereof, and preferred embodiments thereof used in step (2) are as described above. In addition, each component may be in any shape as long as the component is a solid such as a powder and a pellet, but the shape is preferably a pellet.

In step (2), it is possible to obtain a structure excellent in barrier property and drop impact resistance, in which the polyamide resin (C) is dispersed in a layered form in the polyolefin (A) by molding a resin composition containing each component constituting the polyolefin-based structure.

Step (2) is performed, for example, by using a molding device including an extruder equipped with a screw and a heater, a die, and an adaptor for sending a resin composition from the extruder to the die. First, each component is dry-blended, introduced into the extruder, and melt-mixed. Subsequently, the obtained resin composition is fed from a discharge port of the extruder to the die side via an adaptor, extruded via a discharge port of the die, and molded, but during this series of steps, the polyamide resin (C) is dispersed in a layered form in the polyolefin (A). In the present invention, it is important to disperse the polyamide resin (C) in a layered form in order to obtain a structure which is excellent in barrier property.

When a resin composition containing the polyolefin (A), the acid-modified polyolefin (B), and the polyamide resin (C) is prepared by an extruder, the polyamide resin (C) is softened by heat applied from a heater in the extruder, and then stretched in the form of a flake as being subjected to shear stress by rotation of the screw, and subsequently, the flake is further sheared and cut into smaller flakes. Furthermore, the flaky polyamide resin (C) is uniformly dispersed throughout the resin composition by mixing by rotation of the screw. Thus, since the polyamide resin (C) is uniformly dispersed in a layered form in the resin composition, a structure obtained by molding the resin composition exhibits an excellent barrier property.

However, when the polyamide resin (C) is subjected to, for example, excessive shear stress, the dispersion thereof is not limited to the flake, but the polyamide resin (C) is cut into fine particles, and as a result, barrier property deteriorates. Therefore, it is necessary to devise a method, such that the polyamide resin (C) is not excessively dispersed in the resin composition.

In order to prevent the polyamide resin (C) from being excessively dispersed in the resin composition, there is a method of dispersing the polyamide resin (C) at a temperature at which the polyamide resin (C) is softened but is not completely melted nor does not flow or reducing the screw rotation rate. However, since the productivity of the polyolefin-based structure is also typically reduced when the screw rotation rate is reduced, it is preferred to adopt the former method.

With respect to the former method, when the temperature at the time of dispersing the polyamide resin is too high, the polyamide resin (C) is completely melted and excessively dispersed by the shear stress due to shear stress by rotation of the screw, so that the barrier property deteriorates because the polyamide resin (C) is dispersed not in a layered form, but in the form of fine particles. However, when the temperature is a temperature at which the polyamide resin (C) is softened, but is not completely melted nor does not flow, the polyamide resin (C) can be dispersed in a layered form by avoiding the problem.

On the other hand, when the temperature at the time of dispersing the polyamide resin is too low, it is likely that there occur problems that each component including the polyamide resin (C) is not sufficiently softened, unmolten pellets are incorporated into a molded article, an excessive load is exerted on a motor of the extruder, and the like. Furthermore, from the viewpoint of dispersing the polyamide resin (C) in the polyolefin (A), it is preferred to mix each component at a temperature at which the above-described polyolefin (A) is completely melted in step (2).

As another factor affecting the dispersion state of the polyamide resin (C), there is a structure of a screw provided in the extruder. In an extruder for direct blow molding, a single-screw extruder is generally used so as to cope with a large resin pressure. The screw used for the single-screw extruder is typically composed of three parts of a supply zone for conveying each component to a discharge port of the extruder, a compression zone for completely melting a resin composition softened by absorbing heat, and a metering zone for controlling the discharge amount in the order from the side of a hopper which introduces each component into the extruder toward a discharge zone of the extruder.

In the present invention, a general screw can be used without limitation, but it is preferred to use a so-called full flight screw which does not have a mixing portion, generally called as Dulmge or Maddock, in order to prevent the polyamide resin (C) from being excessively dispersed. In addition, in order to suppress the dispersion/distribution effect as much as possible even with a full flight screw, a rapid compression type screw having a comparatively short compression zone is preferably used. As the full flight screw of a rapid compression type, in the case where the number of pitches (one pitch corresponds to the one rotation of the flight) of the entire screw is taken as 100, it is preferred to select a supply zone of 40 to 60, a compression zone of 5 to 20, and a metering zone of 30 to 50, and more preferably, the supply zone is 45 to 55, the compression zone is 10 to 15, and the supply zone is 35 to 45. Furthermore, the distance between the pitches may be arbitrary. Further, a double flight type screw having two flights of the compression zone may be used, or a screw with a pin attached, having a degree of kneading smaller than that of Dalmage, may be used.

The molding method in step (2) is not particularly limited, but a known method such as a direct blow method and a T-die method is adopted.

When the polyolefin-based structure to be produced is a container, it is preferred that the container is molded by a direct blow method. That is, in this case, the molding in step (2) is direct blow molding.

The die head may be composed of any of a T-die, a straight die, and a crosshead die, but it is preferred that the die head in the direct blow method is composed of a crosshead die.

A conventionally known method can be applied to the direct blow method. Examples thereof include a method of molding a container by using a molding device composed of an extruder, an adaptor, a crosshead die equipped with a cylindrical die, a mold, a cooler, a clamping device, and the like to supply a resin composition containing the polyolefin (A), the acid-modified polyolefin (B), and the polyamide resin (C) via the adaptor from a discharge port of the extruder to the cylindrical die, extruding a hollow parison from a discharge port of the cylindrical die, sandwiching the parison therebetween by the clamping device after extruding a certain amount of the hollow parison, and then cooling the parison while blowing air to the parison. For the molding machine, an accumulator may be used or a parison controller may be used to extrude a parison whose thickness is controlled, thereby producing a structure excellent in uniformity of the thickness distribution.

Examples of the cylindrical die include a cylindrical die including a cylindrical die body having an inside hollow part and a mandrel arranged inside the hollow part to form a cylindrical clearance between the hollow part and the die body. The mandrel is not particularly limited, but it is possible to use, for example, a mandrel having a spiral groove formed on the upper side surface thereof. The spiral groove may be a single spiral or a double spiral. The resin composition supplied from the discharge port of the extruder to the upper side of the cylindrical die passes through the spiral groove and the clearance in this order, is molded into a tubular shape, and is discharged from the discharge port of the cylindrical die. In addition, a heart-type or spider-type mandrel may also be used.

By a shear stress applied when the resin composition passes through a narrow clearance, the polyamide resin (C) in the resin composition may also be thinned, thereby being dispersed in a layered form in the polyolefin (A). Therefore, from the viewpoint of exhibiting excellent barrier property, the direct blowing method is a preferred molding method.

Furthermore, when the polyamide resin (C) in the present invention is used, a structure having excellent barrier property is easily obtained without strictly controlling the molding conditions in step (2) as compared to the case of using a dry blend of the polyamides (X) and (Y), and the like. Therefore, the structure of the present invention containing the polyamide resin (C) also has an advantage that the production margin is wide.

Here, when direct blow molding is performed by using the single-screw extruder in step (2), more specifically by extruding the resin composition under the conditions satisfying the following formulae (I) to (IV), it is preferred to obtain a polyolefin-based structure.

$$Am+10° C. \leq T1 \qquad (I)$$

$$Tmch-30° C. \leq T2 \leq Tmch+30° C. \qquad (II)$$

$$Tmch-10° C. \leq T3 \leq Tmch+50° C. \qquad (III)$$

$$Tmch-30° C. \leq T4 \leq Tmch+40° C. \qquad (IV)$$

In the formulae (I) to (IV), T1 is the cylinder temperature (° C.) in the section corresponding to the supply zone and the compression zone of the single-screw extruder. Further, T2 is the cylinder temperature (° C.) in the section corresponding to the metering zone in the single-screw extruder. In addition, T3 is the temperature (° C.) of the adaptor which communicates the extruder and the die, and T4 is the temperature (° C.) of the die.

Furthermore, Am is the melting point of the polyolefin (A), and Tmch is the peak top temperature of the melting peak present on the highest temperature side of the polyamide resin (C) observed by differential scanning calorimetry.

<T1>

Regarding the formula (I), first, when the temperature T1 is controlled to (Am+10° C.) or more, among the raw materials introduced from the hopper of the extruder, the polyolefin (A) is in a molten state in a region corresponding to the supply zone and the compression zone inside the cylinder. In order to sufficiently melt the polyolefin (A) in the region corresponding to the supply zone and the compression zone, it is more preferred that Am+20° C.≤T1.

On the other hand, the upper limit of the temperature T1 is not particularly limited as long as T1 is a temperature at which the polyamide resin (C) is not completely melted nor does flow. The reason is that in the production of the polyolefin-based structure containing the polyamide resin (C), the polyamide resin (C) is not completely melted nor does flow in the region corresponding to the supply zone and the compression zone, and under the conditions satisfying the formulae (II) to (IV), the polyamide resin (C) is dispersed well in the resin composition, and a structure having excellent barrier property can be obtained. From the viewpoint that the polyamide resin (C) is not completely melted nor does flow in the supply zone and the compression zone, it is preferred that T1 Tmch+20° C., it is more preferred that T1 Tmch+15° C., and it is even more preferred that T1 Tmch.

Further, in order to melt the acid-modified polyolefin (B) together with the polyolefin (A), the temperature T1 is preferably higher than the melting point Bm of the acid-modified polyolefin (B), more preferably (Bm+5° C.) or more, and even more preferably (Bm+10° C.) or more.

In addition, the cylinder temperatures in the sections corresponding to the supply zone and the compression zone may be the same as or different from each other. Furthermore, when the cylinder temperatures are different from each other, it is preferred that the cylinder temperature in the section corresponding to the compression zone is higher than the cylinder temperature in the section corresponding to the supply zone.

<T2>

Subsequently, when the cylinder temperature T2 is controlled as described above, the polyamide resin (C) is softened in the region corresponding to the metering zone inside the cylinder. However, it is preferred that the polyamide resin (C) is not softened more than necessary in the region corresponding to the metering zone, and is in a state of being not sufficiently finely dispersed as in the supply zone and the compression zone. Consequently, the resin composition extruded from the single-screw extruder is in a state in which a solid-phase polyamide resin (C) which is not sufficiently finely dispersed in the mixture of the molten polyolefin (A) and the acid-modified polyolefin (B) is dispersed. However, since the cylinder temperature T2 is (Tmch–30° C.) or more and the polyamide resin (C) is sufficiently heated, the polyamide resin (C) can be sufficiently softened at the adaptor portion as described below.

Further, the cylinder temperature T2 is typically higher than the cylinder temperature T1. In addition, the cylinder temperature T2 is preferably the same as or lower than Tmch, more preferably Tmch–20° C.≤T2≤Tmch+10° C., and even more preferably Tmch–20° C.≤T2≤Tmch. As described above, by controlling the cylinder temperature T2 within the above temperature range, it is possible to prevent the polyamide resin (C) from being melted or finely dispersed in the region corresponding to the metering zone and to appropriately soften the polyamide resin (C).

<T3>

The temperature T3 of the adaptor is preferably set to a temperature equal to or higher than Tmch–10° C. Consequently, the polyamide resin (C) is in a sufficiently softened state inside the adaptor. Here, it is preferred that the polyamide resin (C) is supplied from the single-screw extruder in a state of being not sufficiently finely dispersed in the molten components (A) and (B). Consequently, the polyamide resin (C) is softened in a state of being not sufficiently finely dispersed inside the adaptor, and is sent to the die in the state. (Tmch–10° C.)≤T3≤(Tmch+40° C.) is more preferred in order not to impart unnecessary heat history to each raw material and not to cause the dispersion of the component (C) more than necessary. Furthermore, temperature T3 is preferably (temperature T2)–5° C. or more, and more preferably higher than the temperature T2.

<T4>

Next, the polyamide resin (C) softened in a state of being not sufficiently finely dispersed inside the adaptor is sheared by passing through a die of which the width is narrower than the interior of the adaptor and the connecting part, and is thinned and dispersed in a layered form in the polyolefin (A).

When the temperature T4 of the die is equal to or higher than (Tmch–30° C.) or more, the polyamide resin (C) is not solidified inside the die, so that defective extrusion and the like do not occur. Further, when the die temperature T4 is (Tmch+40° C.) or less, no heat history more than necessary is given to each raw material, the quality of the obtained structure deteriorates, or the melt viscosity of each raw material is decreased, so that the occurrence of drawdown is prevented.

From the viewpoint of not imparting an unnecessary heat history to the mixed raw material and further improving extrusion suitability and molding processability, the temperature T4 of the die is more preferably Tmch–20° C.≤T4≤Tmch+40° C., and even more preferably Tmch≤T4≤Tmch+40° C.

When direct blow molding is performed by using the single-screw extruder in Step (2), it is preferred that the molding conditions of Step (2) further satisfy the following condition (P) or condition (Q).

$$\text{Tmch}-30° \text{ C.} \leq T4 \text{ and Tmch}-10° \text{ C.} \leq T1, T2, T3 \quad \text{Condition } (P)$$

$$T1 < \text{Tmch}-20° \text{ C.} \leq T2 < \text{Tmch} \leq T4 \leq T3 \quad \text{Condition } (Q)$$

Under the condition (P), any of the temperature (T1 to T3) from the cylinder of the extruder to the adaptor is set to Tmch–10° C. or more, and the polyamide resin (C) is sufficiently softened in the regions and dispersed in a layered form. In addition, the drawdown is suppressed by setting the die temperature T4 to a temperature equal to or less than T1 to T3 in a range in which the solidification of the polyamide resin (C) does not occur.

On the other hand, under the condition (Q), the cylinder temperature (T1, T2) of the extruder is set to a temperature lower than Tmch, so that the polyamide resin (C) is not sufficiently softened and finely dispersed in the regions. Then, with T1<T2, the adaptor temperature T3 and the die temperature T4 are set to a temperature equal to or higher than Tmch by increasing the temperature in the screw metering zone of the extruder, so that the polyamide resin (C) is dispersed in a layered form in the resin composition by using the shear when the resin composition flows inside the die.

Since the structure of the present invention containing the polyamide resin (C) has a wide production margin, it is possible to obtain a structure excellent in barrier property under any of the molding conditions (P) and (Q), but from the viewpoint of obtaining excellent barrier property, it is more preferred that the molding conditions of step (2) satisfy the condition (Q).

In addition, it is preferred that the resin temperature T5 (outlet resin temperature T5) extruded from the discharge port of the die satisfies the following formula (5).

$$\text{Tmch}-30° \text{ C.} \leq T5 \leq \text{Tmch}+30° \text{ C.} \quad (5)$$

When the outlet resin temperature is within the above temperature range, the polyamide resin (C) is easily dispersed in a layered form, and is easily stretched in a layered form in a non-molten softened state, so that the barrier property of the obtained structure is easily enhanced. From the viewpoint, it is more preferred that T5≤Tmch.

When a container is molded by a direct blow method, a so-called multi-head type molding machine having two or more dies for one extruder may be used. In a molding machine having two or more dies, productivity can be improved because a plurality of containers can be produced at a time.

Further, the above description is an example of molding a container by a direct blow method using a crosshead die, but the method for producing the polyolefin-based structure of the present invention is not limited to the method, and other dies such as a T-die or other molding methods may also be used. For example, when a T-die is used, the resin composition sent from the adaptor to the T-die passes through the clearance constituted by the lip gap and is extruded from the discharge port to be formed into a sheet. Thereafter, the sheet-like molded article can also be secondarily formed into a container by thermoforming such as vacuum forming and pressure forming.

The polyolefin-based structure of the present invention can adopt various shapes such as a container in the shape of a bottle, a tank, and a drum, and a tube.

Examples of an article that can be stored in the container include fuels such as gasoline, kerosene, and light oil, lubricating oils such as engine oils and brake oils, various sanitary goods such as bleaching agents, detergents, and shampoos, ethanol, oxydol, organic solvents such as aromatic hydrocarbons, agricultural chemicals, detergents, various beverages such as vegetable juices and milk beverages, and various goods such as condiments. The polyolefin-based structure of the present invention can be effectively used as a container for enhancing the storage stability of an article to be stored.

EXAMPLES

Hereinafter, the present invention will be described in more detail with reference to Examples. In the present example, % means "% by mass" unless otherwise specified. In the Examples, various analyses and evaluations were carried out by the following methods.

(1) MFR (g/10 min) of Polyolefin (A) and Acid-Modified Polyolefin (B)

The measurement was carried out under the conditions of 190° C. and 2.16 kgf using a melt indexer manufactured by Toyo Seiki Seisaku-Sho, Ltd., in accordance with JIS K 7210-1: 2014.

(2) Density (g/cm$^3$) of Polyolefin (A) and Acid-Modified Polyolefin (B)

By using a sheet forming device equipped with an extruder, a T-die, a cooling roll, a puller, etc., a single-layer sheet having a thickness of about 1 mm was formed. Subsequently, a test piece having a size of 50 mm in length and 50 mm in width was cut from the thus formed sheet, and the true specific gravity thereof was measured using a true specific gravity meter ("ED-120T" manufactured by ALFAMIRAGE Co., Ltd.

(3) Acid Value (mgKOH/g) of Acid-Modified Polyolefin (B)

The measurement was carried out by neutralization titration in accordance with JIS K0070-1992. 1 g of the acid-modified polyolefin was accurately weighed and dissolved in 100 mL of xylene at about 120° C. while stirring. After completely dissolving the acid-modified polyolefin therein, a phenolphthalein solution was added thereto, and neutralization titration was carried out by using a 0.1 mol/L potassium hydroxide ethanol solution whose concentration was accurately determined in advance. The acid value was calculated according to the following formula from the dropping amount (T) (unit: mL), the factor of the 0.1 mol/L potassium hydroxide ethanol solution (f), (1/10 of the formula weight: 56.11 of potassium hydroxide (5.611), and the mass (S) (unit: g) of the acid-modified polyolefin.

$$\text{Acid value} = T \times f \times 5.611/S$$

(4) Relative Viscosity of Polyamide 0.2 g of a polyamide was accurately weighed and dissolved in 20 mL of 96% sulfuric acid at 20 to 30° C. while stirring. After completely dissolving the polyamide therein, a 5-mL of the resulting solution was rapidly sampled and placed in a Canon-Fenske viscometer, the viscometer was left in a thermostatic chamber at 25° C. for 10 minutes, and then a dropping time (t) of the solution was measured. Also, a dropping time (t0) of the 96% by mass of sulfuric acid itself was measured under the same conditions. The relative viscosity was calculated according to the following formula from the t and t0.

$$\text{Relative viscosity} = t/t0$$

(5) Melting Point of Polyolefin (A), Acid-Modified Polyolefin (B), and Polyamide Using a differential scanning calorimeter (manufactured by Shimadzu Corporation, "DSC-60"), the measurement was carried out by heating from room temperature up to 280° C. at a heating rate of 10° C./min under nitrogen stream. Next, on the resultant chart, the temperature of the melting peak top was read.

(6) Toluene Permeability

After the bottle manufactured in each Example was filled with 200 mL of toluene, an opening of a mouth portion was heat-sealed with aluminum vapor deposition film and further plugged with a cap, and the total mass was measured. Subsequently, the bottle filled with toluene was stored in a thermostatic bath at 40° C., the total mass was measured every 24 hours, and the measurement was continued until the amount of mass reduced became stable. The amount of mass reduced per day in this case was taken as a toluene permeability (g/bottle·day).

(7) Pseudo Gasoline (CE10) Permeability

After the bottle manufactured in each example was filled with 200 mL of pseudo-gasoline (CE10) composed of isootance/toluene/ethanol=45/45/10 vol %, an opening of a mouth portion was heat-sealed with an aluminum vapor deposition film and further plugged with a cap, and the total mass was measured. Subsequently, the bottle filled with CE10 was stored in a thermostatic bath at 40° C., the total mass was measured every 24 hours, and the measurement was continued until the amount of mass reduced became stable. The amount of mass reduced per day in this case was taken as a CE10 permeability (g/bottle·day).

(8) Oxygen Permeability

The oxygen permeability (mL/0.21atm·bottle·day) of the bottle manufactured in each example was measured under an atmosphere of 23° C., external relative humidity 50%, and internal relative humidity 100% according to ASTM D3985 using an oxygen permeability measuring device (manufactured by MOCON Inc., model: OX-TRAN2/61).

(9) Drop Test (−25° C.)

The bottle manufactured in each example was filled with 200 mL of ethylene glycol and closed by a cap, and the temperature was controlled for 4 hours in a thermostatic chamber at −25° C. Next, in the thermostatic chamber at −25° C., the bottle was dropped with the bottom thereof facing downward onto concrete from a height of 1.2 m three times in a continuous manner, and the number of broken bottles in the test among 5 or 10 bottles was counted.

(10) Dispersion State

After the bottle was cut into TD and the cross section thereof was smoothed with a cutter, the polyamide portion was dyed by applying dilute iodine tincture (manufactured by Tsukishima Yakuhin Co., Ltd.) to the cross section, and then the dispersion state of the polyamide resin was observed with a microscope at a magnification of 10 times. In the bottles obtained in Examples 1 to 7 and Comparative Examples 1 to 7 and 9, all the polyamide resins were dispersed in a layered form.

Preparation Example 1

Preparation of Copolymerized Polyamide (N-MXD6I) of m-Xylylenediamine, Adipic Acid, and Isophthalic Acid Into a pressure-resistant melt polymerization pot with an internal volume of 50 L equipped with a stirrer, a partial condenser, a total condenser, a pressure regulator, a thermometer, a dripping tank, a pump, an aspirator, a nitrogen introducing tube, a bottom drain valve and a strand die, 12,120 g (82.94 mol) of adipic acid (AA), 880 g (5.29 mol) of isophthalic acid (IPA), 10.96 g (0.10 mol) of sodium hypophosphite, and 5.68 g (0.07 mol) of sodium acetate, which were accurately weighed, were put, the melt polymerization pot was sufficiently purged with nitrogen, and then the interior of the melt polymerization pot was sealed, and the inside temperature of the melt polymerization pot was increased to 170° C. with stirring while maintaining the inside pressure at 0.4 MPaG.

After the temperature reached 170° C., 11,962 g (87.83 mol) of m-xylylenediamine (MXDA) (molar ratio (MXDA/AA+IPA) of a diamine component/a dicarboxylic acid component introduced)=0.9955) stored in the dripping tank was started to be added dropwise to the molten raw material in the melt polymerization pot, and the interior of the melt polymerization pot was continuously warmed to 260° C. while removing the condensed water generated out of the system by maintaining the pressure in the melt polymerization pot at 0.4 MPaG. After completion of the dropwise addition of m-xylylenediamine, the interior of the melt polymerization pot was gradually returned to atmospheric pressure, and then the condensed water was removed by continuously depressurizing the interior of the melt polymerization pot to 80 kPaG using an aspirator. The stirring was stopped at the time when a predetermined torque was reached by observing the stirring torque of the stirrer during depressurization, the interior of the melt polymerization pot was pressurized with nitrogen, the bottom drain valve was opened, and the resulting product was withdrawn and pelletized, thereby obtaining a molten polymerized product (relative viscosity 2.1) of a pelletized copolymerized polyamide N-MXD6I (hereinafter, referred to as "MXD6I").

The MXD6I pellet, which is the molten polymerized product, was introduced into a rotating drum heater made of stainless steel and rotated at 5 rpm. The interior of the reaction system was further heated from room temperature to 140° C. under a smaller amount of nitrogen stream by sufficiently replacing the reaction system with nitrogen. At the time when the temperature in the reaction system reached 140° C., the pressure was reduced to 1 Torr or less, and the temperature in the system was further increased to 190° C. for 130 minutes. At the time when the temperature in the system reached 190° C., the solid phase polymerization reaction was continued at the same temperature for 60 minutes.

After completion of the reaction, the pressure reduction was terminated and the temperature in the system was lowered under nitrogen stream, and at the time when the temperature reached 60° C., the pellet was extracted, thereby obtaining a solid phase polymerized product of MXD6I. In the present example, the solid phase polymerized product MXD6I was used. The proportion of the isophthalic acid unit in the dicarboxylic acid unit of the MXD6I solid phase polymerized product was 6.0 mol %, the relative viscosity was 2.8, and the melting point ($Tm_0$) was 229.0° C.

Preparation Example 2

Preparation of Polyamide Resin PA-1

After a pellet of polymethaxylylene adipamide ("MX Nylon S6121" manufactured by Mitsubishi Gas Chemical Company, Inc., relative viscosity=3.6, melting point ($Tm_0$)= 237.9° C., and hereinafter referred to as "MXD6") and a pellet of an aliphatic polyamide Nylon 6 ("UBE Nylon 1030B" manufactured by Ube Industries, Ltd., relative viscosity=4.4, melting point=221.0° C., and hereinafter referred to as "PA6") were dry-blended at a mass ratio of 60/40, introduced into a hopper of a twin-screw kneading extruder ("TEM-37BS" (screw diameter=37 mm, L/D=42) manufactured by Toshiba Machine Co., Ltd.), and melt-kneaded at a set temperature of 260° C. (the resin temperature was 280° C.) and a screw rotation rate of 150 rpm of the extruder, the resultant product was extruded in the form of a strand, water-cooled, and then pelletized with a pelletizer, thereby preparing a pellet of a polyamide resin PA-1. The melting point $Tm_1$ derived from MXD 6 in PA-1 was 236.1° C., and the difference between the melting point $Tm_0$ and melting point $Tm_1$ of MXD 6 was 1.8° C. Further, the melt-kneading temperature is the resin temperature measured by an infrared radiation thermometer provided at the discharge port of the extruder.

Preparation Example 3

Preparation of Polyamide Resin PA-2

A pellet of the polyamide resin PA-2 was prepared in the same manner as in Preparation Example 2, except that the mass ratio of MXD6 to PA6 was changed into 40/60. The melting point $Tm_1$ derived from MXD6 in PA-2 was 237.1° C., and the difference between the melting point $Tm_0$ and melting point $Tm_1$ of MXD6 was 0.8° C.

Preparation Example 4

Preparation of Polyamide Resin PA-3

A pellet of the polyamide resin PA-3 was prepared in the same manner as in Preparation Example 2, except that the set temperature of the extruder was changed into 250° C. (the resin temperature was 270° C.) by using MXD6I obtained in Preparation Example 1 instead of MXD6. The melting point $Tm_1$ derived from MXD6I in PA-3 was 228.3°

C., and the difference between the melting point $Tm_0$ and melting point $Tm_1$ of MXD6I was 0.7° C.

Preparation Example 5

Preparation of Polyamide Resin PA-4

A pellet of the polyamide resin PA-4 was prepared in the same manner as in Preparation Example 2, except that the aliphatic polyamide Nylon 6,6/6 ("Novamid N-X138" manufactured by DMS Co., Ltd., relative viscosity=4.1, melting point=199.0° C., and hereinafter referred to as "PA666") was used instead of PA6. The melting point $Tm_1$ derived from MXD6 in PA-4 was 236.3° C., and the difference between the melting point $Tm_0$ and melting point $Tm_1$ of MXD6 was 1.6° C.

Preparation Example 6

Preparation of Polyamide Resin PA-7

The pellet of MXD6 and the pellet of PA6 were dry-blended at a mass ratio of 60/40 at 25° C. The obtained mixed pellet was used as the polyamide resin PA-7.

Preparation Example 7

Preparation of Polyamide Resin PA-8

The pellet of MXD6 and the pellet of PA6 were dry-blended at a mass ratio of 40/60 at 25° C. The obtained mixed pellet was used as the polyamide resin PA-8.

Preparation Example 8

Preparation of Polyamide Resin PA-9

A pellet of the polyamide resin PA-9 was prepared in the same manner as in Preparation Example 2, except that the set temperature of the extruder was changed into 300° C. (the resin temperature was 315° C.). The melting point $Tm_1$ derived from MXD6 in PA-9 was 234.8° C., and the difference between the melting point $Tm_0$ and melting point $Tm_1$ of MXD6 was 3.1° C.

Preparation Example 9

Preparation of Polyamide Resin PA-10

A pellet of the polyamide resin PA-10 was prepared in the same manner as in Preparation Example 3, except that the set temperature of the extruder was changed into 300° C. (the resin temperature was 315° C.). The melting point $Tm_1$ derived from MXD6 in PA-10 was 234.1° C., and the difference between the melting point $Tm_0$ and melting point $Tm_1$ of MXD6 was 3.8° C.

Example 1

Using a double head-type (having two cylindrical dies) single-layer direct blow molding device equipped with 50 mm single-screw extruder, an adaptor, a cylindrical die with a parison controller, a mold, a clamping device, and a cooler, a bottle with a threaded plug, which had an internal volume of 400 mL and a main body part thickness of 1 mm, was molded. As the cylindrical die, a die with a die body having a cylindrical hollow part and a single-spiral mandrel arranged inside the hollow part was used.

As the material of the bottle, using high-density polyethylene ("B5803" manufactured by Keiyo Polyethylene Co., Ltd., hereinafter referred to as "HDPE-1") as the polyolefin (A), a maleic acid-modified polyethylene ("Admer HE810" manufactured by Mitsui Chemicals, Inc., hereinafter referred to as "AD-1") as the acid-modified polyolefin (B), the polyamide resin PA-1 obtained in Preparation Example 2 as the polyamide resin (C), and "EPH-W-6365" manufactured by Polycol Color Industries Co., Ltd. (40% master batch of titanium oxide, hereinafter referred to as "MB-1") as a master batch of titanium oxide, mixed pellets, in which these materials were dry-blended at % by mass described in Table 2, were used.

The above mixed pellets were introduced into the hopper of the extruder, and melt-mixed at a screw rotation rate of 32 rpm by setting the molding temperature (cylinder temperature, adaptor temperature, and die temperature of the extruder) to the temperature shown in Table 1. In Table 1, C1 to C4 are the cylinder temperature (T1) of the supply zone to the compression zone of the screw in the extruder, C4 and C5 is the cylinder temperature (T2) of the metering zone of the screw in the extruder, AD is the adaptor temperature (T3), and D1 to D3 are the temperature corresponding to the die temperature (T4), and correspond to D1 (an upper part of the die), D2 (an intermediate part of the die), and D3 (a lower part of the die). Next, the resin composition was discharged from the discharge port of the extruder and supplied to the upper inlet of the cylindrical die via the adaptor, the parison was extruded from the discharge port of the cylindrical die, and a bottle with a threaded plug was obtained by direct blow molding. Further, the resin temperature measured by an infrared radiation thermometer provided at the discharge port of the extruder was 236° C. Next, with respect to the obtained bottle, the toluene permeability, the permeability of the pseudo gasoline CE10, the oxygen permeability, and dropping crack were evaluated by the above methods. The results are shown in Table 2.

Examples 2 and 4

The evaluation was carried out by molding a bottle with a threaded plug in the same manner as in Example 1, except that as the polyamide resin (C), the polyamide resin PA-2 or PA-4 was each used instead of the polyamide resin PA-1. The results are shown in Table 2.

Example 3

The evaluation was carried out by molding a bottle with a threaded plug in the same manner as in Example 1, except that as the polyamide resin (C), the polyamide resin PA-3 was each used instead of the polyamide resin PA-1, and the molding conditions were changed as shown in Table 1. The results are shown in Table 2.

Example 5

The evaluation was carried out by molding a bottle with a threaded plug in the same manner as in Example 1, except that as the acid-modified polyolefin (B), AD-2 to be described below was used instead of AD-1. The results are shown in Table 2.

Example 6

The evaluation was carried out by molding a bottle with a threaded plug in the same manner as in Example 1, except that the molding condition was changed as shown in Table 1. The results are shown in Table 2.

Example 7

The evaluation was carried out by molding a bottle with a threaded plug in the same manner as in Example 1, except that as the polyolefin (A), HDPE-2 was used instead of HDPE-1. The results are shown in Table 2.

Comparative Example 1

The evaluation was carried out by molding a bottle with a threaded plug in the same manner as in Example 1, except that as the polyamide resin (C), the pellet of MXD6 (polyamide resin PA-5) was used instead of the polyamide resin PA-1. The results are shown in Table 2.

Comparative Example 2

The evaluation was carried out by molding a bottle with a threaded plug in the same manner as in Example 1, except that as the polyamide resin (C), the pellet of PA6 (polyamide resin PA-6) was used instead of the polyamide resin PA-1, and the molding conditions were changed as shown in Table 1. The results are shown in Table 2.

Comparative Example 3

The evaluation was carried out by molding a bottle with a threaded plug in the same manner as in Example 1, except that as the polyamide resin (C), the pellet of the polyamide resin PA-7 (dry-blended) was used instead of the polyamide resin PA-1. The results are shown in Table 2.

Comparative Example 4

The evaluation was carried out by molding a bottle with a threaded plug in the same manner as in Example 1, except that as the polyamide resin (C), the pellet of the polyamide resin PA-8 (dry-blended) was used instead of the polyamide resin PA-1. The results are shown in Table 2.

Comparative Example 5

The evaluation was carried out by molding a bottle with a threaded plug in the same manner as in Example 1, except that as the polyamide resin (C), the pellet of the polyamide resin PA-9 (the difference between the melting point $Tm_0$ and the melting point $Tm_1$ was 3.1° C.) was used instead of the polyamide resin PA-1. The results are shown in Table 2.

Comparative Example 6

The evaluation was carried out by molding a bottle with a threaded plug in the same manner as in Example 1, except that as the polyamide resin (C), the pellet of the polyamide resin PA-10 (the difference between the melting point $Tm_0$ and the melting point $Tm_1$ was 3.8° C.) was used instead of the polyamide resin PA-1. The results are shown in Table 2.

Comparative Example 7

The evaluation was carried out by molding a bottle with a threaded plug in the same manner as in Comparative Example 3, except that the molding condition was changed as shown in Table 1. The results are shown in Table 2.

Comparative Example 8

The evaluation was carried out by molding a bottle with a threaded plug in the same manner as in Example 1, except that the molding conditions shown in Table 1 were used by using only HDPE-1 which is the polyolefin (A) without using the acid-modified polyolefin (B) and the polyamide resin (C). The results are shown in Table 2.

Comparative Example 9

The evaluation was carried out by molding a bottle with a threaded plug in the same manner as in Comparative Example 1, except that as the polyolefin (A), HDPE-2 was used instead of HDPE-1. The results are shown in Table 2.

Comparative Example 10

The evaluation was carried out by molding a bottle with a threaded plug in the same manner as in Comparative Example 8, except that as the polyolefin (A), HDPE-2 was used instead of HDPE-1. The results are shown in Table 2.

TABLE 1

| | C1 °C. | C2 °C. | C3 °C. | C4 °C. | C5 °C. | AD °C. | D1 °C. | D2 °C. | D3 °C. | Outlet resin temperature °C. | Screw rotation rate rpm |
|---|---|---|---|---|---|---|---|---|---|---|---|
| Example 1 | 160 | 165 | 180 | 190 | 230 | 250 | 250 | 248 | 245 | 236 | 32 |
| Example 2 | 160 | 165 | 180 | 190 | 230 | 250 | 250 | 248 | 245 | 236 | 32 |
| Example 3 | 160 | 165 | 180 | 190 | 220 | 238 | 238 | 238 | 235 | 227 | 32 |
| Example 4 | 160 | 165 | 180 | 190 | 230 | 250 | 250 | 248 | 245 | 236 | 32 |
| Example 5 | 160 | 165 | 180 | 190 | 230 | 250 | 250 | 248 | 245 | 236 | 32 |
| Example 6 | 230 | 232 | 233 | 237 | 237 | 235 | 235 | 220 | 220 | 219 | 31 |
| Example 7 | 160 | 165 | 180 | 190 | 230 | 250 | 250 | 248 | 245 | 236 | 32 |
| Comparative Example 1 | 160 | 165 | 180 | 190 | 230 | 250 | 250 | 248 | 245 | 236 | 32 |
| Comparative Example 2 | 160 | 165 | 180 | 190 | 230 | 250 | 250 | 245 | 240 | 227 | 32 |
| Comparative Example 3 | 160 | 165 | 180 | 190 | 230 | 250 | 250 | 248 | 245 | 236 | 32 |
| Comparative Example 4 | 160 | 165 | 180 | 190 | 230 | 250 | 250 | 248 | 245 | 236 | 32 |

TABLE 1-continued

| | C1 °C. | C2 °C. | C3 °C. | C4 °C. | C5 °C. | AD °C. | D1 °C. | D2 °C. | D3 °C. | Outlet resin temperature °C. | Screw rotation rate rpm |
|---|---|---|---|---|---|---|---|---|---|---|---|
| Comparative Example 5 | 160 | 165 | 180 | 190 | 230 | 250 | 250 | 248 | 245 | 236 | 32 |
| Comparative Example 6 | 160 | 165 | 180 | 190 | 230 | 250 | 250 | 248 | 245 | 236 | 32 |
| Comparative Example 7 | 230 | 232 | 233 | 237 | 237 | 235 | 235 | 220 | 220 | 219 | 31 |
| Comparative Example 8 | 160 | 165 | 180 | 190 | 220 | 220 | 220 | 220 | 220 | 208 | 32 |
| Comparative Example 9 | 160 | 165 | 180 | 190 | 230 | 250 | 250 | 248 | 245 | 236 | 32 |
| Comparative Example 10 | 160 | 165 | 180 | 190 | 220 | 220 | 220 | 220 | 220 | 208 | 32 |

TABLE 2

| | Polyolefin (A) | | Acid-modified polyolefin (B) | | | | Polyamide resin (C) | | | | | |
|---|---|---|---|---|---|---|---|---|---|---|---|---|
| | Type | MP [°C.] | Mass ratio [%] | Type | Density [g/cm³] | Acid value [mgKOH/g] | Mass ratio [%] | Type | Polyamide (X) | Polyamide (Y) | (X)/(Y) mass ratio | Blend method | Blend Temperature *1[°C.] |
| Example 1 | HDPE-1 | 133 | 78.82 | AD-1 | 0.960 | 19.0 | 9.85 | PA-1 | MXD6 | PA6 | 60/40 | Melt | 260 |
| Example 2 | HDPE-1 | 133 | 78.82 | AD-1 | 0.960 | 19.0 | 9.85 | PA-2 | MXD6 | PA6 | 40/60 | Melt | 260 |
| Example 3 | HDPE-1 | 133 | 78.82 | AD-1 | 0.960 | 19.0 | 9.85 | PA-3 | MXD6I | PA6 | 60/40 | Melt | 250 |
| Example 4 | HDPE-1 | 133 | 78.82 | AD-1 | 0.960 | 19.0 | 9.85 | PA-4 | MXD6 | PA666 | 60/40 | Melt | 260 |
| Example 5 | HDPE-1 | 133 | 78.82 | AD-2 | 0.927 | 9.5 | 9.85 | PA-1 | MXD6 | PA6 | 60/40 | Melt | 260 |
| Example 6 | HDPE-1 | 133 | 78.82 | AD-1 | 0.960 | 19.0 | 9.85 | PA-1 | MXD6 | PA6 | 60/40 | Melt | 260 |
| Example 7 | HDPE-2 | 127 | 78.82 | AD-1 | 0.960 | 19.0 | 9.85 | PA-1 | MXD6 | PA6 | 60/40 | Melt | 260 |
| Comparative Example 1 | HDPE-1 | 133 | 78.82 | AD-1 | 0.960 | 19.0 | 9.85 | PA-5 | MXD6 | — | 100/0 | — | — |
| Comparative Example 2 | HDPE-1 | 133 | 78.82 | AD-1 | 0.960 | 19.0 | 9.85 | PA-6 | — | PA6 | 0/100 | — | — |
| Comparative Example 3 | HDPE-1 | 133 | 78.82 | AD-1 | 0.960 | 19.0 | 9.85 | PA-7 | MXD6 | PA6 | 60/40 | Dry | 25 |
| Comparative Example 4 | HDPE-1 | 133 | 78.82 | AD-1 | 0.960 | 19.0 | 9.85 | PA-8 | MXD6 | PA6 | 40/60 | Dry | 25 |
| Comparative Example 5 | HDPE-1 | 133 | 78.82 | AD-1 | 0.960 | 19.0 | 9.85 | PA-9 | MXD6 | PA6 | 60/40 | Melt | 300 |
| Comparative Example 6 | HDPE-1 | 133 | 78.82 | AD-1 | 0.960 | 19.0 | 9.85 | PA-10 | MXD6 | PA6 | 40/60 | Melt | 300 |
| Comparative Example 7 | HDPE-1 | 133 | 78.82 | AD-1 | 0.960 | 19.0 | 9.85 | PA-7 | MXD6 | PA6 | 60/40 | Dry | 25 |
| Comparative Example 8 | HDPE-1 | 133 | 100.00 | — | — | — | — | — | — | — | — | — | — |
| Comparative Example 9 | HDPE-2 | 127 | 78.82 | AD-1 | 0.960 | 19.0 | 9.85 | PA-5 | MXD6 | — | 100/0 | — | — |
| Comparative Example 10 | HDPE-2 | 127 | 100.00 | — | — | — | — | — | — | — | — | — | — |

| | Polyamide resin (C) | | | | | Light-shielding material (D) | | | Evaluation result | | | |
|---|---|---|---|---|---|---|---|---|---|---|---|---|
| | $Tm_0$ [°C.] | $Tm_1$ [°C.] | Δ ($Tm_0 - Tm_1$) [°C.] | Tmch [°C.] | Mass ratio [%] | Type | MB mass *2[%] | $TiO_2$ mass *3[%] | Toluene permeability *4 | CE10 permeability *4 | Oxygen permeability *5 | Dropping Crack (−25°C.) |
| Example 1 | 237.9 | 236.1 | 1.8 | 236.1 | 9.85 | MB-1 | 1.48 | 0.59 | 0.038 | 0.128 | 0.055 | 0/10 |
| Example 2 | 237.9 | 237.1 | 0.8 | 237.1 | 9.85 | MB-1 | 1.48 | 0.59 | 0.036 | 0.241 | 0.079 | 0/10 |
| Example 3 | 229.0 | 228.3 | 0.7 | 228.3 | 9.85 | MB-1 | 1.48 | 0.59 | 0.035 | 0.127 | 0.056 | 0/10 |
| Example 4 | 237.9 | 236.3 | 1.6 | 236.3 | 9.85 | MB-1 | 1.48 | 0.59 | 0.093 | 0.165 | 0.074 | 0/10 |
| Example 5 | 237.9 | 236.1 | 1.8 | 236.1 | 9.85 | MB-1 | 1.48 | 0.59 | 0.332 | 0.398 | 0.092 | 0/10 |
| Example 6 | 237.9 | 236.1 | 1.8 | 236.1 | 9.85 | MB-1 | 1.48 | 0.59 | 0.058 | 0.189 | 0.079 | 0/10 |
| Example 7 | 237.9 | 236.1 | 1.8 | 236.1 | 9.85 | MB-1 | 1.48 | 0.59 | 0.077 | 0.271 | 0.119 | 0/10 |
| Comparative Example 1 | 237.9 | 237.9 | 0 | 237.9 | 9.85 | MB-1 | 1.48 | 0.59 | 0.163 | 0.148 | 0.051 | 6/10 |
| Comparative Example 2 | — | — | — | 221.0 | 9.85 | MB-1 | 1.48 | 0.59 | 0.157 | 0.585 | 0.139 | 0/10 |
| Comparative Example 3 | 237.9 | 237.9 | 0 | 237.9 | 9.85 | MB-1 | 1.48 | 0.59 | 0.153 | 0.203 | 0.082 | 4/10 |
| Comparative Example 4 | 237.9 | 237.9 | 0 | 237.9 | 9.85 | MB-1 | 1.48 | 0.59 | 0.124 | 0.302 | 0.092 | 2/10 |
| Comparative Example 5 | 237.9 | 234.8 | 3.1 | 234.8 | 9.85 | MB-1 | 1.48 | 0.59 | 0.392 | 0.621 | 0.153 | 0/10 |

TABLE 2-continued

| | | | | | | | | | | | |
|---|---|---|---|---|---|---|---|---|---|---|---|
| Comparative Example 6 | 237.9 | 234.1 | 3.8 | 234.1 | 9.85 | MB-1 | 1.48 | 0.59 | 0.376 | 0.735 | 0.172 | 0/10 |
| Comparative Example 7 | 237.9 | 237.9 | 0 | 237.9 | 9.85 | MB-1 | 1.48 | 0.59 | 2.085 | 1.042 | 0.247 | 2/10 |
| Comparative Example 8 | — | — | — | — | — | — | — | — | 2.876 | 1.425 | 0.350 | 0/5 |
| Comparative Example 9 | 237.9 | 237.9 | 0 | 237.9 | 9.85 | MB-1 | 1.478 | 0.59 | 0.389 | 0.976 | 0.208 | 2/10 |
| Comparative Example 10 | — | — | — | — | — | — | — | — | 4.372 | 2.296 | 0.580 | 0/5 |

*1Set temperature of extruder (excluding Comparative Examples 3, 4, and 7)
*2Blending ratio as master batch
*3Blending ratio as titanium oxide
*4Unit [g/bottle day]
*5Unit [mL/0.21 atm bottle day]

<Polyolefin (A) Used>
HDPE-1:
  manufactured by Keiyo Polyethylene Co., Ltd., high-density polyethylene, trade name: "Keiyo Polyethylene B5803," MFR=0.3 g/10 min (190° C., 2.16 kgf), density=0.957 g/cm$^3$, melting point=133° C., and environmental stress cracking resistance (ESCR): 100 h (ASTM D1693: constant strain method)
HDPE-2:
  manufactured by Japan Polyethylene Corporation, high-density polyethylene, trade name: "Novatec HD HB120R," MFR=0.2 g/10 min (190° C., 2.16 kgf), density=0.938 g/cm$^3$, melting point=127° C., and environmental stress cracking resistance (ESCR): 1000 h (ASTM D1693: constant strain method)
(Acid-Modified Polyolefin (B) Used)
AD-1:
  manufactured by Mitsui Chemicals, Inc., maleic acid-modified polyethylene, trade name: "Admer HE810," MFR=1.7 g/10 min (190° C., 2.16 kgf), density=0.960 g/cm$^3$, acid value=19.0 mgKOH/g, and melting point=130.2° C.
AD-2:
  manufactured by Mitsui Chemicals, Inc., maleic acid-modified polyethylene, trade name: "Admer AT1000," MFR=1.8 g/10 min (190° C., 2.16 kgf), density=0.927 g/cm$^3$, acid value=9.5 mgKOH/g, and melting point=123.1° C.
<Polyamide (X) Used>
MXD6:
  manufactured by Mitsubishi Gas Chemical Company, Inc., polymethaxylylene adipamide, trade name: "MX Nylon S6121," relative viscosity=3.6, and melting point (Tm$_0$)=237.9° C.
MXD6I:
  the polyamide (copolymerized polyamide of m-xylylenediamine, adipic acid, and isophthalic acid) obtained in Preparation Example 1, the isophthalic acid unit in the dicarboxylic acid unit=6.0 mol %, the relative viscosity=2.8, and the melting point (Tm$_0$)=229.0° C.
<Aliphatic Polyamide (Y) Used>
PA6:
  manufactured by Ube Industries, Ltd., Nylon 6, trade name: "UBE Nylon 1030B," relative viscosity=4.4, and melting point=221.0° C.
PA666:
  manufactured by DSM Company, Nylon 6,6/6, trade name: "Novamid N-X138," relative viscosity=4.1, and melting point=199.0° C.

<Master Batch of Light-Shielding Material (D) (Titanium Oxide) Used>
MB-1:
  manufactured by Polycol Color Industries Co., Ltd., 40% master batch of titanium oxide, and trade name: "EPH-W-6365"

Bottles of Examples which are the polyolefin-based structures of the present invention were all excellent in barrier property and drop impact resistance under low temperature conditions. Further, a bottle using AD-1 as the component (B) showed a particularly high barrier property.

On the contrary, each of the bottles of the Comparative Examples could not satisfy both barrier property and drop impact resistance.

Furthermore, as evident from the comparison of Comparative Examples 1 and 9, when a MXD6 single substance is used as the polyamide component, the bottle using HDPE-1 as the component (A) has high barrier property, but the drop impact resistance thereof tends to be decreased as compared to the bottle using HDPE-2 having a high environmental stress cracking resistance. However, as can be seen from the comparison of Examples 1 and 7, the bottle using the polyamide resin (C) specified in the present application can achieve high drop impact resistance regardless of the type of component (A), and also has a good barrier property.

INDUSTRIAL APPLICABILITY

The polyolefin-based structure of the present invention can satisfy both excellent barrier property and drop impact resistance at low temperature, and can be effectively used as a container for storing fuels such as gasoline, kerosene, and light oil, organic solvents such as aromatic hydrocarbons, other articles, agricultural chemicals, detergents, foods, chemicals, and the like.

The invention claimed is:
1. A polyolefin-based structure comprising 60 to 97% by mass of an unmodified polyolefin (A), 1 to 35% by mass of an acid-modified, polyolefin (B), and 2 to 35% by mass of a polyamide resin (C), wherein the polyamide resin (C) is dispersed in a layered form in the unmodified polyolefin (A) and the acid-modified polyolefin (B), and the polyamide resin (C) is a melt-kneaded product of 30 to 70% by mass of a polyamide (X) that contains a diamine unit containing 70 mol % or more of a m-xylylenediamine unit and a dicarboxylic acid unit containing an α,ω-linear aliphatic dicarboxylic acid unit and 30 to 70% by mass of an aliphatic polyamide (Y), provided that a total of the polyamide (X) and the polyamide (Y) is taken as 100% by mass, and a difference between a melting point $Tm_o$ of the polyamide (X) prior to melt kneading as observed by differential scanning calorimetry and a melting point $Tm_1$ derived from the polyamide (X) in the polyamide resin (C), is from 0.1 to 2.5° C.

2. The polyolefin-based structure according to claim 1, further comprising a light-shielding material (D) in an amount of more than 0% by mass and 10% by mass or less.

3. The polyolefin-based structure according to claim 2, wherein the light-shielding material (D) is titanium oxide.

4. The polyolefin-based structure according to claim 1, wherein the α,ω-linear aliphatic dicarboxylic acid unit in the polyamide (X) has from 4 to 20 carbon atoms.

5. The polyolefin-based structure according to claim 4, wherein the am-linear aliphatic dicarboxylic acid unit in the polyamide (X) is an adipic acid unit.

6. The polyolefin-based structure according to claim 1, wherein the dicarboxylic acid unit in the polyamide (X) contains the am-linear aliphatic dicarboxylic acid unit and an isophthalic acid unit in a total amount of 70 mol % or more based on the amount of dicarboxylic acid unit in the polyamide (X), and a molar ratio of the α,ω-linear aliphatic dicarboxylic acid unit to the isophthalic acid unit is from 20:80 to 100:0.

7. The polyolefin-based structure according to claim 1, wherein the aliphatic polyamide (Y) is one or more selected from the group consisting of Nylon 6, Nylon 6,6, and Nylon 6,6/6.

8. The polyolefin-based structure according to claim 1, wherein a melt flow rate of the acid-modified polyolefin (B) is from 0.1 to 10 g/10 min.

9. The polyolefin-based structure according to claim 1, wherein an acid value of the acid-modified polyolefin (B) is from 5 to 30 mgKOH/g.

10. The polyolefin-based structure according to claim 1, wherein a density of the acid-modified polyolefin (B) is from 0.910 to 0.970 $g/cm^3$.

11. The polyolefin-based structure according to claim 1, which is a container.

12. A method for producing the polyolefin-based structure according to claim 1, comprising:
   step (1): melt-kneading 30 to 70% by mass of the polyamide (X) that contains the diamine unit containing 70 mol % or more of the m-xylylenediamine unit and the dicarboxylic acid unit containing the α,ω-linear aliphatic dicarboxylic acid unit and 30 to 70% by mass of the aliphatic polyamide (Y), provided that a total of the polyamide (X) and the polyamide (Y) is taken as 100% by mass, at a temperature of the melting point $Tm_o$ of the polyamide (X)+10° C. or more and $Tm_o$+60° C. or less to thereby obtain the polyamide resin (C); and
   step (2): molding a resin composition containing 60 to 97% by mass of the unmodified polyolefin (A), 1 to 35% by mass of the acid-modified polyolefin (B), and 2 to 35% by mass of the polyamide resin (C) to thereby obtain a polyolefin-based structure.

13. The method for producing the polyolefin-based structure of claim 12, wherein the molding method in step (2) is a direct blow method.

\* \* \* \* \*